US012113621B2

(12) United States Patent
Horn et al.

(10) Patent No.: US 12,113,621 B2
(45) Date of Patent: Oct. 8, 2024

(54) SIGNAL RECONSTRUCTION FOR DYNAMIC ANALOG-TO-DIGITAL CONVERTERS

(71) Applicant: QUALCOMM Incorporated, San Diego, CA (US)

(72) Inventors: Idan Michael Horn, Hod Hasharon (IL); Shay Landis, Hod Hasharon (IL); Assaf Touboul, Netanya (IL); Amit Bar-Or Tillinger, Tel-Aviv (IL)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/124,245

(22) Filed: Dec. 16, 2020

(65) Prior Publication Data

US 2022/0190963 A1 Jun. 16, 2022

(51) Int. Cl.
*H04L 1/14* (2006.01)
*H04L 1/1607* (2023.01)
*H04L 1/1812* (2023.01)
*H04L 27/26* (2006.01)
*H04W 72/0446* (2023.01)

(52) U.S. Cl.
CPC .......... *H04L 1/1657* (2013.01); *H04L 1/1819* (2013.01); *H04L 27/2624* (2013.01); *H04W 72/0446* (2013.01)

(58) Field of Classification Search
None
See application file for complete search history.

(56) References Cited

U.S. PATENT DOCUMENTS

| | | | |
|---|---|---|---|
| 10,187,176 B2 * | 1/2019 | Deng | H04J 14/0298 |
| 2005/0002472 A1 * | 1/2005 | Lee | H04L 25/067 |
| | | | 375/316 |

(Continued)

OTHER PUBLICATIONS

Kolomvakis, T. et al., Reconstruction of Clipping Signals in Quantized Uplink Massive MIMO Systems, May 2020, IEEE, vol. 68 pp. 2891-2905 (Year: 2020).*

(Continued)

*Primary Examiner* — Mujtaba M Chaudry
(74) *Attorney, Agent, or Firm* — QUALCOMM Incorporated

(57) ABSTRACT

Methods, systems, and devices for wireless communication are described. A transmitting device may determine reconstruction information for a time-domain signal and may transmit the reconstruction information with the time-domain signal to a receiving device. The transmitting device may generate the reconstruction information based on estimates of how the receiving device may process the time-domain signal. For example, the transmitting device may apply a channel estimate to samples of the time-domain signal, and further perform clipping and quantization of the samples based on an estimated dynamic analog-to-digital converter (ADC) resolution of the receiving device. The transmitting device may generate the reconstruction information (e.g., using machine learning or other techniques) based on samples having the channel estimate applied and the clipped and quantized samples. The receiving device may process the received time-domain signal and use the reconstruction information to reconstruct the processed time-domain signal.

28 Claims, 16 Drawing Sheets

(56) References Cited

U.S. PATENT DOCUMENTS

| | | | | |
|---|---|---|---|---|
| 2008/0192856 | A1* | 8/2008 | Jongren | H04B 7/0697 |
| | | | | 375/267 |
| 2008/0260059 | A1* | 10/2008 | Pan | H04B 7/0652 |
| | | | | 375/260 |
| 2013/0265964 | A1 | 10/2013 | Yokomakura et al. | |
| 2014/0169430 | A1* | 6/2014 | Nilsson | H04B 7/043 |
| | | | | 375/227 |
| 2014/0169490 | A1* | 6/2014 | Medbo | H04W 52/346 |
| | | | | 375/267 |
| 2020/0295912 | A1* | 9/2020 | Venkatraman | H04L 25/0204 |

OTHER PUBLICATIONS

International Search Report and Written Opinion—PCT/US2021/072545—ISA/EPO—Mar. 23, 2022.
Kolomvakis N., et al., "Reconstruction of Clipped Signals in Quantized Uplink Massive MIMO Systems", IEEE Transactions on Communications, IEEE Service Center, Piscataway, NJ, USA, vol. 68, No. 5, Feb. 4, 2020 (Feb. 4, 2020), pp. 2891-2905, XP011788428, ISSN: 0090-6778, DOI: 10.1109/TCOMM. 2020.2971975 [reteived on May 14, 2020] Section I.B, Section III.B, Section IV.A, Section V, Section VI.
Wu B., et al., "Iterative Channel Estimation and Signal Detection in Clipped OFDM", Global Telecommunications Conference, 2005, Globecom '05. IEEE St. Loius, MO, USA Nov. 28-Dec. 2, 2005, Piscataway, NJ, USA, IEEE, vol. 4, Nov. 28, 2005 (Nov. 28, 2005), pp. 2265-2269, XP010879514, DOI: 10.1109/Glocom. 2005. 1578067, ISBN: 978-0-7803-9414-8, Section I, Section IV.

\* cited by examiner

SIGNAL RECONSTRUCTION FOR DYNAMIC ANALOG-TO-DIGITAL CONVERTERS

FIELD OF TECHNOLOGY

The following relates to wireless communication, including signal reconstruction for dynamic analog-to-digital converters.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may process a signal received from another devices (such as another UE or base station) using an analog-to-digital converter (ADC). In some cases, power consumption at the UE may be affected by a sampling frequency and a resolution of the ADC. As some systems may operate in relatively higher carrier frequencies, and correspondingly increased sampling frequencies, a UE may be affected by increased power consumption when receiving and processing signals at higher frequencies.

SUMMARY

The described techniques relate to improved methods, systems, devices, and apparatuses that support signal reconstruction for dynamic analog-to-digital converters (ADCs). Generally, the described techniques support a first wireless device (e.g., a base station) determining reconstruction information for a time-domain signal, and transmitting the reconstruction information with the time-domain signal to a second wireless device (e.g., a user equipment (UE)). For example, the base station may generate the reconstruction information based on estimating channel conditions and creating samples of the time-domain signal, where the estimated channel may be applied to the samples. Further, the base station may estimate a number of bits used at an ADC of the UE (e.g., where the UE supports dynamic ADC resolutions) and perform clipping and quantization of the signal based on the estimated number of ADC bits. The base station may use the clipped and quantized version of the signal in addition to an unclipped (and unquantized) version of the signal to generate the reconstruction information. In some examples, the reconstruction information may be generated using one or more machine learning algorithms, supervised learning algorithms, or other techniques.

In some examples, reconstruction information may be used to estimate, by the base station, the reconstruction of the time-domain signal at the UE (e.g., using the generated reconstruction information). In some cases, the estimate of the reconstructed signal may be verified using one or more error-detection processes (such as a cyclic redundancy check (CRC)) such that the base station may verify the accuracy of its estimate of the signal reconstruction. In such cases, the base station may use the machine learning algorithm to further modify or adjust the reconstruction information based on a result of the error-detection processes (e.g., if a CRC failed). Upon determining that the reconstruction information may enable accurate reconstruction of the time-domain signal (e.g., upon a successful CRC), the base station may transmit both the time-domain signal and the reconstruction information to the UE.

The UE may receive the time-domain signal and the reconstruction information from the base station, where the UE may process the received time-domain signal according to a resolution of the UE's ADC. Such processing may result in a clipped and quantized version of the signal, and the UE may according use the received reconstruction information to reconstruct the processed time-domain signal to accurately determine the content of the original time-domain signal from the base station.

A method for wireless communication is described. The method may include applying a channel estimate to one or more samples of a time-domain signal to be transmitted to a wireless device, performing clipping and quantization on the one or more samples that have the channel estimate applied, where the clipping and quantization is based on an estimated ADC resolution of the wireless device, generating reconstruction information for the time-domain signal based on the one or more samples that have the channel estimate applied and the one or more clipped and quantized samples, and transmitting the time-domain signal and the reconstruction information to the wireless device.

An apparatus for wireless communication is described. The apparatus may include a processor, memory in electronic communication with the processor, and instructions stored in the memory. The instructions may be executable by the processor to cause the apparatus to apply a channel estimate to one or more samples of a time-domain signal to be transmitted to a wireless device, perform clipping and quantization on the one or more samples that have the channel estimate applied, where the clipping and quantization is based on an estimated ADC resolution of the wireless device, generate reconstruction information for the time-domain signal based on the one or more samples that have the channel estimate applied and the one or more clipped and quantized samples, and transmit the time-domain signal and the reconstruction information to the wireless device.

Another apparatus for wireless communication is described. The apparatus may include means for applying a channel estimate to one or more samples of a time-domain signal to be transmitted to a wireless device, means for performing clipping and quantization on the one or more samples that have the channel estimate applied, where the clipping and quantization is based on an estimated ADC resolution of the wireless device, means for generating reconstruction information for the time-domain signal based on the one or more samples that have the channel estimate applied and the one or more clipped and quantized samples, and means for transmitting the time-domain signal and the reconstruction information to the wireless device.

A non-transitory computer-readable medium storing code for wireless communication is described. The code may include instructions executable by a processor to apply a channel estimate to one or more samples of a time-domain signal to be transmitted to a wireless device, perform clipping and quantization on the one or more samples that have the channel estimate applied, where the clipping and quantization is based on an estimated ADC resolution of the wireless device, generate reconstruction information for the time-domain signal based on the one or more samples that have the channel estimate applied and the one or more clipped and quantized samples, and transmit the time-domain signal and the reconstruction information to the wireless device.

In some examples of the method, apparatuses, and non-transitory computer-readable medium described herein, generating the reconstruction information may include operations, features, means, or instructions for processing the one or more samples that may have the channel estimate applied and the one or more clipped and quantized samples using a machine learning algorithm, an iterative hypothesis testing algorithm, or any combination thereof.

Some examples of the method, apparatuses, and non-transitory computer-readable medium described herein may further include operations, features, means, or instructions for estimating reconstruction of the time-domain signal at the wireless device based on the processing, where the reconstruction information may be based on the estimated reconstruction of the time-domain signal.

Some examples of the method, apparatuses, and non-transitory computer-readable medium described herein may further include operations, features, means, or instructions for performing one or more error detecting operations based on the estimated reconstruction of the time-domain signal, where generating the reconstruction information may be based on a result of the one or more error detecting operations.

Some examples of the method, apparatuses, and non-transitory computer-readable medium described herein may further include operations, features, means, or instructions for determining that an error detecting operation of the one or more error detecting operations was successful and mapping the generated reconstruction information to resources for transmission to the wireless device based on the successful error detecting operation, where transmitting the time-domain signal and the reconstruction information to the wireless device may be based on the mapping.

Some examples of the method, apparatuses, and non-transitory computer-readable medium described herein may further include operations, features, means, or instructions for determining that an error detecting operation of the one or more error detecting operations was unsuccessful and reprocessing the one or more samples that may have the channel estimate applied and the clipped and quantized one or more samples using the one or more machine learning algorithms, the reprocessing based on the unsuccessful error detecting operation.

In some examples of the method, apparatuses, and non-transitory computer-readable medium described herein, the one or more error detecting operations include CRC operations.

Some examples of the method, apparatuses, and non-transitory computer-readable medium described herein may further include operations, features, means, or instructions for identifying a number of bits associated with the one or more error detecting operations, one or more thresholds associated with the one or more error detecting operations, or any combination thereof, where the reconstruction information includes an indication of the number of bits, the one or more thresholds, or any combination thereof.

Some examples of the method, apparatuses, and non-transitory computer-readable medium described herein may further include operations, features, means, or instructions for identifying one or more machine learning coefficients associated with the machine learning algorithm, a type of the machine learning algorithm, a dimensionality of the machine learning algorithm, or any combination thereof, where the reconstruction information includes an indication of the one or more machine learning coefficients, the type of machine learning algorithm, the dimensionality, or any combination thereof.

Some examples of the method, apparatuses, and non-transitory computer-readable medium described herein may further include operations, features, means, or instructions for identifying, from the one or more clipped and quantized samples, a location and value of one or more clipped samples, where the reconstruction information includes an indication of the location and value of the one or more clipped samples.

Some examples of the method, apparatuses, and non-transitory computer-readable medium described herein may further include operations, features, means, or instructions for identifying, from the one or more samples, a location and value of one or more time-domain samples, where the reconstruction information includes an indication of the location and value of the one or more time-domain samples.

Some examples of the method, apparatuses, and non-transitory computer-readable medium described herein may further include operations, features, means, or instructions for identifying, from the one or more samples, a location and value of one or more frequency-domain symbols, where the reconstruction information includes an indication of the location and value of the one or more frequency-domain symbols.

Some examples of the method, apparatuses, and non-transitory computer-readable medium described herein may further include operations, features, means, or instructions for identifying one or more kernels corresponding to non-linear clipping based on the estimated ADC resolution of the wireless device, where the reconstruction information includes an indication of the one or more kernels.

Some examples of the method, apparatuses, and non-transitory computer-readable medium described herein may further include operations, features, means, or instructions for identifying one or more filter coefficients, where the reconstruction information includes an indication of the one or more filter coefficients.

Some examples of the method, apparatuses, and non-transitory computer-readable medium described herein may further include operations, features, means, or instructions for receiving, from the wireless device, a reference signal and generating the channel estimate based on the received reference signal.

Some examples of the method, apparatuses, and non-transitory computer-readable medium described herein may further include operations, features, means, or instructions for determining the estimated ADC resolution of the wireless device based on the received reference signal.

A method for wireless communication at a wireless device is described. The method may include receiving a signal and reconstruction information for the signal, processing the received signal based on a resolution of an ADC resolution of the wireless device, where the processing results in a clipped and quantized version of the signal, applying the reconstruction information to the clipped and quantized version of the signal, and reconstructing the signal based on the applied reconstruction information.

An apparatus for wireless communication at a wireless device is described. The apparatus may include a processor, memory in electronic communication with the processor, and instructions stored in the memory. The instructions may be executable by the processor to cause the apparatus to receive a signal and reconstruction information for the signal, process the received signal based on a resolution of an ADC resolution of the wireless device, where the processing results in a clipped and quantized version of the signal, apply the reconstruction information to the clipped and quantized version of the signal, and reconstruct the signal based on the applied reconstruction information.

Another apparatus for wireless communication at a wireless device is described. The apparatus may include means for receiving a signal and reconstruction information for the signal, means for processing the received signal based on a resolution of an ADC resolution of the wireless device, where the processing results in a clipped and quantized version of the signal, means for applying the reconstruction information to the clipped and quantized version of the signal, and means for reconstructing the signal based on the applied reconstruction information.

A non-transitory computer-readable medium storing code for wireless communication at a wireless device is described. The code may include instructions executable by a processor to receive a signal and reconstruction information for the signal, process the received signal based on a resolution of an ADC resolution of the wireless device, where the processing results in a clipped and quantized version of the signal, apply the reconstruction information to the clipped and quantized version of the signal, and reconstruct the signal based on the applied reconstruction information.

In some examples of the method, apparatuses, and non-transitory computer-readable medium described herein, reconstructing the signal may include operations, features, means, or instructions for performing one or more reconstruction procedures on the clipped and quantized version of the signal using the reconstruction information.

Some examples of the method, apparatuses, and non-transitory computer-readable medium described herein may further include operations, features, means, or instructions for configuring a number of iterations for the one or more reconstruction procedures, where reconstructing the signal may be based on the configured number of iterations.

Some examples of the method, apparatuses, and non-transitory computer-readable medium described herein may further include operations, features, means, or instructions for determining that the reconstruction information includes an indication of a number of bits associated with one or more error detecting operations, one or more thresholds associated with the one or more error detecting operations, or any combination thereof, where the one or more reconstruction procedures may be based on the one or more error detecting operations, the number of bits, the one or more thresholds, or any combination thereof.

Some examples of the method, apparatuses, and non-transitory computer-readable medium described herein may further include operations, features, means, or instructions for determining that the reconstruction information includes an indication of one or more machine learning coefficients associated with a machine learning algorithm, a type of the machine learning algorithm, a dimensionality of the machine learning algorithm, or any combination thereof, where the one or more reconstruction procedures may be based on the machine learning algorithm, the one or more machine learning coefficients, the type of machine learning algorithm, the dimensionality, or any combination thereof.

Some examples of the method, apparatuses, and non-transitory computer-readable medium described herein may further include operations, features, means, or instructions for determining that the reconstruction information includes an indication of a location and value of one or more clipped samples, where the one or more reconstruction procedures may be based on the location and value of the one or more clipped samples.

Some examples of the method, apparatuses, and non-transitory computer-readable medium described herein may further include operations, features, means, or instructions for determining that the reconstruction information includes an indication of a location and value of one or more time-domain samples, where the one or more reconstruction procedures may be based on the location and value of the one or more time-domain samples.

Some examples of the method, apparatuses, and non-transitory computer-readable medium described herein may further include operations, features, means, or instructions for determining that the reconstruction information includes an indication of a location and value of one or more frequency-domain symbols, where the one or more reconstruction procedures may be based on the location and value of the one or more frequency-domain symbols.

Some examples of the method, apparatuses, and non-transitory computer-readable medium described herein may further include operations, features, means, or instructions for determining that the reconstruction information includes an indication of one or more kernels corresponding to nonlinear clipping based on the ADC resolution of the wireless device, where the one or more reconstruction procedures may be based on the one or more kernels.

Some examples of the method, apparatuses, and non-transitory computer-readable medium described herein may further include operations, features, means, or instructions for determining that the reconstruction information includes an indication of one or more filter coefficients, where the one or more reconstruction procedures may be based on the one or more filter coefficients.

In some examples of the method, apparatuses, and non-transitory computer-readable medium described herein, the wireless device supports a dynamic configuration of two or more ADC resolutions.

DETAILED DESCRIPTION

Figure 1:
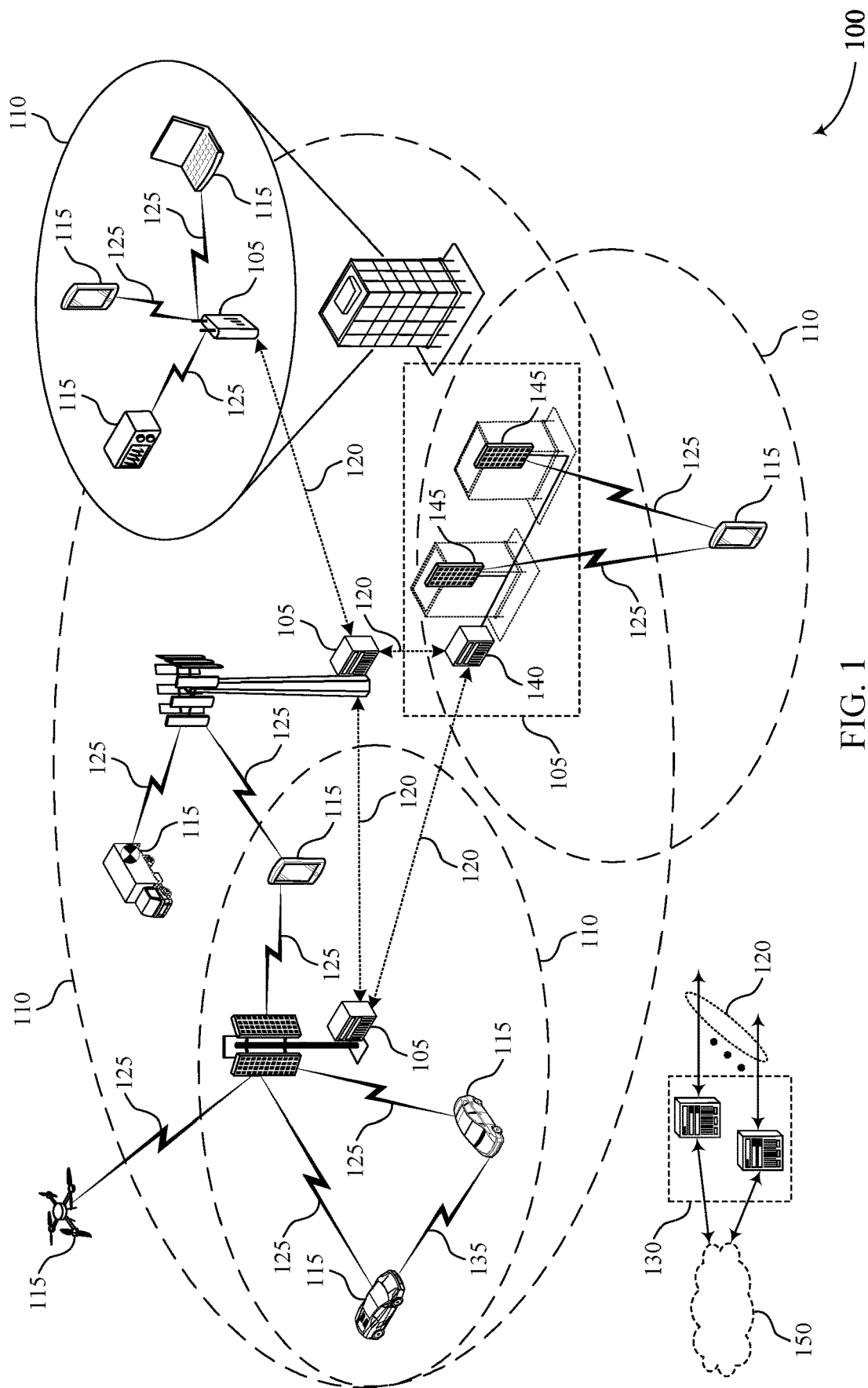
FIGS. 1 and 2 illustrate examples of wireless communications systems that support signal reconstruction for dynamic analog-to-digital converters (ADCs) in accordance with aspects of the present disclosure.

In some wireless communications systems, a wireless device may process a signal received from another wireless device using an analog-to-digital converter (ADC). A sampling rate of an ADC may be based on the carrier frequency of the received signal. For example, in systems that support relatively higher carrier frequencies (e.g., such as frequency bands used in systems supporting frequency range 4 (FR4) (e.g., 52.6 GHz-114.25 GHz bands), FR5 (which may be referred to as "upper millimeter wave bands" or a "sub-THz regime), FR6 (e.g., bands up to 3 THz), 5G communications, 6G communications, or the like), an ADC may likewise operate at higher sampling frequencies. In addition, the resolution of the processed signal (e.g., the digital output of the ADC) may be based on the number of bits the ADC is configured to support. For example, an ADC resolution may correspond to number of different values recognized by the ADC for an analog input, which may likewise corresponds to discrete levels for the digital output of the ADC. The ADC resolution may be referred to as a voltage or a number of bits. In some aspects, a relatively higher number of bits (e.g., a higher ADC resolution) may correspond to a greater resolution of a processed signal (e.g., a relatively higher bit value may correspond to a greater number of discrete digital levels for an output of the ADC).

However, power consumption of the ADC and, subsequently, other components of the UE (e.g., digital front end (DFE) components) may increase as the sampling frequency and resolution (e.g., number of bits) increase. For example, ADC power consumption may increase linearly with the sampling frequency and exponentially with the number of bits used. Consequentially, using relatively higher carrier frequencies may result in greater power consumption at a wireless device. Thus, as a wireless device supports communications over a wide bandwidth of carrier frequencies, optimal system function may be dependent on the ability to modulate or reduce a number of bits used by the ADC. For example, the use of low-resolution ADCs may reduce power consumption at a wireless device, thereby improving power consumption and battery life at a wireless device, particularly those wireless devices operating at relatively higher frequency ranges.

A wireless device, such as a UE, that supports a dynamically configurable ADC may thus optimize the resolution of the ADC by selecting a resolution size (e.g., a bit quantity) that provides an appropriate tradeoff between power consumption and performance. A transmitting device (e.g., a base station or another UE) may support the UE in such optimization by providing supplementary or reconstruction information, which may be used to reconstruct a received signal. More efficient reconstruction of a signal may reduce a number of bits used at the ADC of the UE, thereby saving power.

The transmitting device may generate the reconstruction information by estimating a number of ADC bits used by the UE. In some cases, the generation of the reconstruction information may also be based on estimated channel conditions and the use of time domain samples of a message (e.g., data to be transmitted on a physical downlink shared channel (PDSCH)). The time domain data may be further clipped and quantized by the transmitting device, and the reconstruction information may be generated based on clipped and unclipped versions of the message, as well as the channel estimate and estimated number of ADC bits. The transmitting device may transmit a "clean" time domain signal (e.g., the message without clipping or the channel estimation applied) and the reconstruction information to the UE. The UE may process the received time domain signal based on a resolution of the ADC of the UE and may use the received reconstruction information to perform reconstruction procedures on the processed signal. For instance, an output of the UE's dynamic ADC may provide a clipped and quantized version of the received signal. However, because the transmitting device estimated such clipping and quantization when generating the reconstruction information, the reconstruction information may be used to accurately reconstruct and determine, with some degree of accuracy, the full content of the message from the base station.

In some examples, the transmitting device may generate the reconstruction information through various processes and computations. For instance, the transmitting device may utilize machine learning and subsequent estimates of signal reconstruction using the reconstruction information. Here, the transmitting device may simulate how the UE may reconstruct the signal to determine the appropriate information to provide for signal reconstruction. In some cases, the transmitting device may further implement cyclic redundancy check (CRC) procedures to verify that the reconstruction information may be used to accurately reconstruct a transmitted signal. In addition, the reconstruction information may include various information related to the signal and used for reconstruction of a received signal. The information, for example, may include locations and values of clipped signals, locations and values of time domain samples or frequency domain symbols that may be useful in the reconstruction process, filter coefficients, machine learning coefficients, or the like.

Aspects of the disclosure are initially described in the context of wireless communications systems. Aspects of the disclosure are then described in the context of process flows. Aspects of the disclosure are further illustrated by and described with reference to apparatus diagrams, system diagrams, and flowcharts that relate to signal reconstruction for dynamic ADCs.

FIG. 1 illustrates an example of a wireless communications system 100 that supports signal reconstruction for dynamic ADCs in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a CRC), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A device, such as a UE 115, operating in the wireless communications system 100 may have a dynamically configurable ADC such that the ADC may operate using different numbers of bits for processing received signals. The UE 115 may optimize the resolution of the ADC by selecting a resolution size (e.g., a bit quantity) that provides an appropriate tradeoff between power consumption and performance. A transmitting device, such as a base station 105, may support the UE 115 in such optimization by providing supplementary or reconstruction information, which may be used to reconstruct a received signal. For example, the base station 105 may generate reconstruction information for a time domain signal to be transmitted to the UE 115. The base station 105 may generate the reconstruction information by estimating a number of ADC bits used by the UE 115, estimating channel conditions between the UE 115 and the base station 105, and using time domain samples of the signal, or some combination thereof. In some cases, the base station 105 may perform clipping and quantizing on the time domain samples, and may generate the reconstruction information based on clipped and unclipped versions of the signal (e.g., in addition to the channel estimate and estimated number of ADC bits). The base station 105 may transmit a "clean" time domain signal (e.g., the message without clipping or the channel estimation applied) and the reconstruction information to the UE 115. The UE 115 may process the received time domain signal based on a resolution of the ADC of the UE 115 and may use the received reconstruction information to perform reconstruction procedures on the processed signal.

In some examples, the base station 105 may generate the reconstruction information through various processes and computations. For instance, the base station 105 may utilize machine learning and subsequent estimates of signal reconstruction using the reconstruction information. Here, the base station 105 may simulate how the UE 115 may reconstruct the signal to determine the appropriate information to provide for signal reconstruction. In some cases, the base station 105 may further implement CRC procedures to verify that the reconstruction information may be used to accurately reconstruct a transmitted signal.

Figure 2:
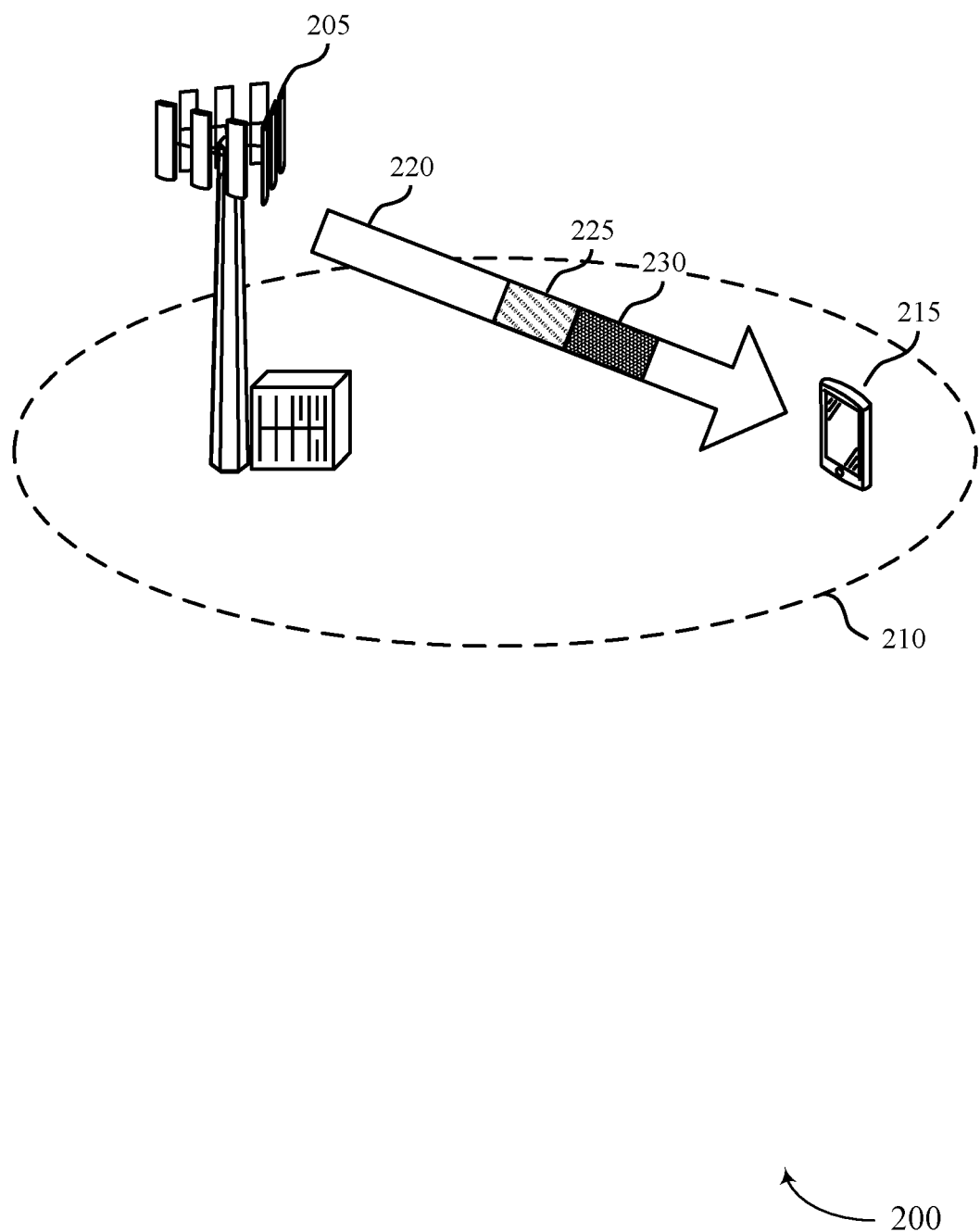

FIG. 2 illustrates an example of a wireless communications system 200 that supports signal reconstruction for dynamic ADCs in accordance with aspects of the present disclosure. In some examples, wireless communications system 200 may implement aspects of wireless communications system 100. The wireless communications system 200 includes a UE 215 and a base station 205, which may be examples of a UE 115 and base station 105, respectively, as described with reference to FIG. 1. It is to be understood that references to specific wireless devices (e.g., UEs or base stations) in the below figures are provided for illustrative purposes, and different wireless devices not specifically referred to herein may be used interchangeably with those described herein. Likewise, the described operations performed by a UE 215 may, in some cases, be performed by a base station 205, and vice versa. Additionally, or alternatively, the base station 205 may be an example of an IAB node, a repeater node (e.g., configured with some retransmission capability), or the like.

The base station 205 and the UE 215 may be located in coverage area 210. The base station 205 and UE 215 may perform a connection establishment procedure (such as a random access procedure or the like) and may communicate over one or more communication links 220 (e.g., uplink 220-a and downlink 220-b) upon establishing a connection. In some examples, the base station 205 and UE 215 may communicate using a relatively higher frequency bands, which may have a relatively large bandwidth or larger portions of a bandwidth allocated for communications. As an example, wireless communications system 200 may support communications using 5G or NR technologies, communications using 6G technologies or other standardized wireless technologies, communications in FR4 (e.g., 52.6 GHz-114.25 GHz bands), FR5 (which may be referred to as "upper millimeter wave bands" or a "sub-THz regime), and beyond (e.g., bands up to 3 THz).

The communication links 220 may include an uplink 220-a and downlink 220-b. If the base station 205 transmits a signal to the UE 215, the UE 215 may process the received signal using various components of a receiver chain, which may include an analog front end (AFE), an ADC, a DFE (e.g., comprising one or more filters, one or more local oscillators, one or more sampling-rate converters, or the like), and other components. The ADC may convert the signal from an analog signal to a digital signal by quantizing a voltage range and sampling the signal with the quantized voltages at a particular sampling frequency. In some examples, quantization of the ADC may be non-uniform (e.g., a digital output of the ADC may be non-linear). For instance, the ADC may quantize the incoming analog signal with non-uniform voltage steps. In such examples, a first voltage step may correspond to 2 volts where a second voltage step may correspond to 3 volts. The resolution of the processed signal may be based on a number of bits corresponding to the ADC resolution. For example, a larger number of bits may allow for greater signal resolution (e.g., a greater number of discrete digital "steps" or values that represent the analog signal), which may result in reliable communications. However, as the number of bits supported by an ADC increases, ADC power consumption and, consequentially, power consumption by other components of the UE 215 (e.g., DFE components) may also increase. Particularly, ADC power consumption may increase exponentially with the number of bits used for the ADC resolution (e.g., $2N$, where N is the ADC number of bits). As a wireless device may be able to support communications over a wide range of carrier frequencies, optimal system function and power management may be improved with an ability to modulate or dynamically reduce the ADC number of bits when processing a signal.

The UE 215 may be configured with or include a dynamic ADC such that the UE 215 may adjust or change a resolution size of the ADC (e.g., change a number of bits used by the ADC) for processing a received signal. For instance, the UE 215 may adjust the number of bits used in the ADC based on a configuration of communications with the base station 205. In some other examples, the UE 215 may modify its ADC resolution based on an indication from the base station 205. Based on the support of a dynamic ADC, the UE 215 may determine a set of ADC resolution sizes (e.g., two or more bit quantities, where each bit quantity may correspond to an ADC resolution size) that the UE 215 supports, and the UE 215 may dynamically configure the two or more bit quantities.

According to the techniques described herein, a base station 205 may generate and transmit improved signal reconstruction information to assist a UE 215 in performing more efficient signal reconstruction, which may enable the UE 215 to reduce the number of bits used in the ADC of the UE 215 and thereby reduce power consumption. That is, a downlink message (e.g., including data) for the UE 215 may also include reconstruction information (e.g., supplementary information, side information, or other like terminology) for the message, where the reconstruction information may be used to reconstruct the message after being processed by the transceiver at the UE 215.

The base station 205 may sample a time domain signal 225 that is to be transmitted to the UE 215, e.g., via communication link 220, and may perform one or more operations to the samples or use other processes to generate reconstruction information 230. The base station 205 may simulate (e.g., using one or more machine learning algorithms) the reconstruction process and/or capabilities of the UE 215 so that the reconstruction information 230 may be more efficiently used by the UE 215. For instance, the base station 205 may estimate channel conditions of the communication link 220, and may apply the channel conditions to the samples. The base station may estimate channel conditions based on receiving a reference signal (e.g., a sounding reference signal (SRS)) from the UE 215 via an uplink channel (e.g., a physical uplink shared channel (PUSCH)), and assuming channel reciprocity for a downlink channel (e.g., a physical downlink shared channel (PDSCH)). According to the channel estimation, the base station 205 may estimate a resolution (e.g., a number of bits) that the UE 215 may use for the ADC of the UE 215, and may use the estimated ADC resolution to perform quantizing and clipping on the samples in a manner equivalent to what may be performed by the ADC of the UE 215. Clipping a signal may involve modifying or restricting the signal to remain within one or more thresholds, such as limiting the signal to a percentage of a peak power. A clipped signal may have a reduced peak-to-average-power ratio (PAPR), which may provide improved performance (e.g., as compared to a non-clipped signal). A receiving device, such as the UE 215, may receive the clipped signal and perform a reconstruction procedure to restore the signal to a higher resolution.

The base station 205 may thus generate reconstruction information 230 for the time domain signal 225 using the samples that have the channel estimate applied and the clipped and quantized samples. In some examples, the base station 205 may implement error detecting operations, such as CRC procedures or other techniques, to verify that the reconstruction information 230 may be used to accurately reconstruct the time domain signal 225. If an error detecting operation is unsuccessful, the base station 205 may reprocess the samples, for example, using one or more machine learning algorithms. In some examples, the base station 205 may continue to reprocess the samples until an error detecting operation is successful.

The base station 205 may include, in the reconstruction information 230, information for the UE 215 to use in reconstructing the time domain signal 225. For example, reconstruction information 230 may include indications of a number of bits or one or more thresholds associated with the error detecting operation(s). Additionally, or alternatively, reconstruction information 230 may include correction information related to an unsuccessful error detecting operation. Reconstruction information 230 may include information associated with the machine learning algorithm used by the base station 205, such as indications of machine learning coefficients, types, or dimensionalities. In some cases, reconstruction information 230 may also include indications of quantization peaks, locations and values of clipped signals, locations and values of time domain samples, locations and values of frequency domain symbols, kernels corresponding to nonlinear clipping (e.g., based on the ADC resolution of the UE 215), or filter coefficients, among other examples.

The base station 205 may transmit the reconstruction information 230 and the time domain signal 225 to the UE 215 via communication link 220. The UE 215 may use the ADC at a configured resolution to process the received time domain signal 225 to obtain a clipped and quantized version. The UE 215 may reconstruct the time domain signal 225 by applying the reconstruction information 230 to the clipped and quantized signal, for example, by performing one or more reconstruction procedures. In some cases, the UE 215 may configure a number of iterations for the reconstruction procedure(s) and may reconstruct the signal by performing the reconstruction procedure(s) over the iterations.

Figure 3:
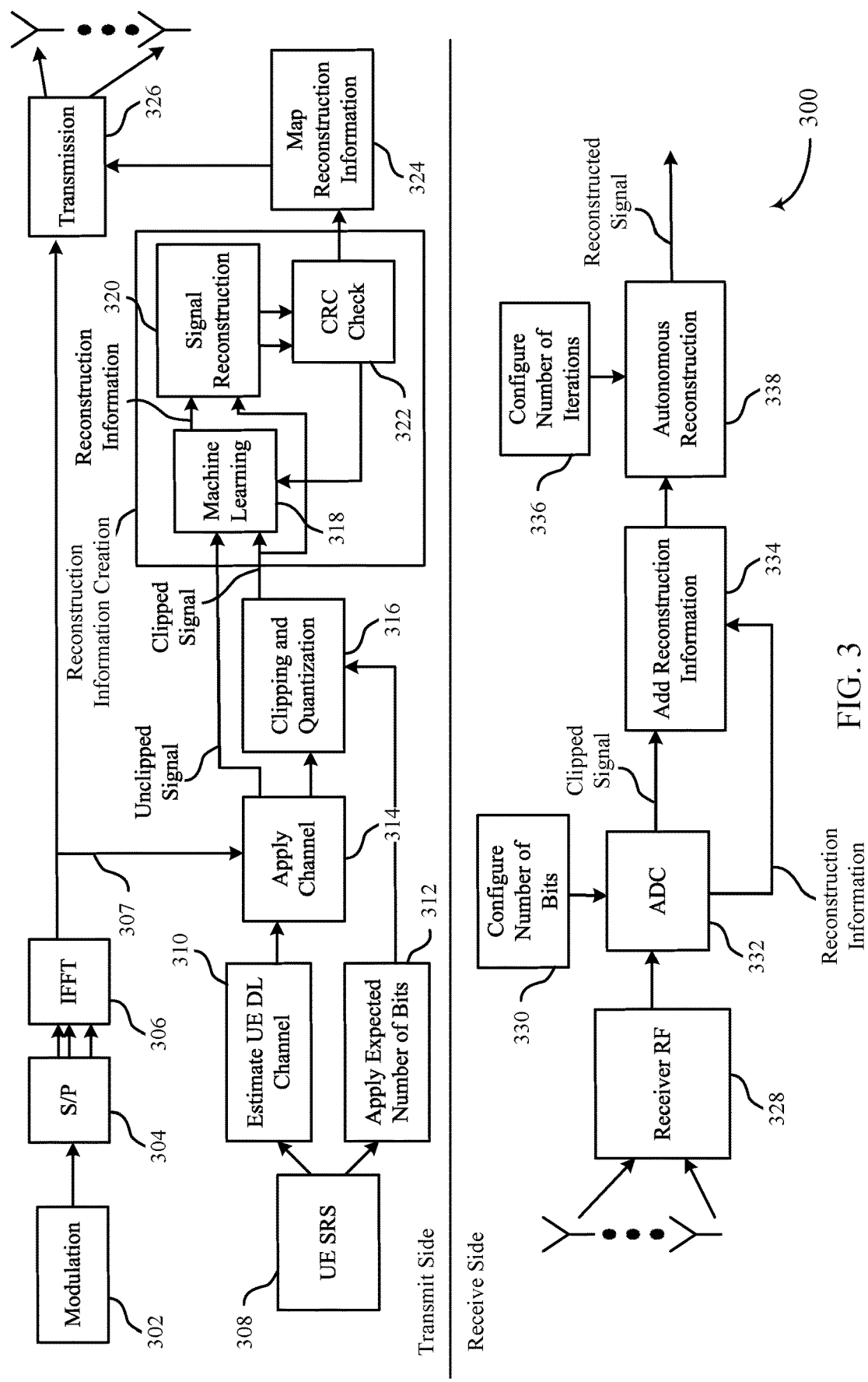
FIGS. 3 and 4 illustrate examples of process flows that support signal reconstruction for dynamic ADCs in accordance with aspects of the present disclosure.

FIG. 3 illustrates an example of a process flow 300 that supports signal reconstruction for dynamic ADCs in accordance with aspects of the present disclosure. Process flow 300 may be an example of operations performed by a transmitting device and a receiving device, which may be examples of various types of wireless devices as described herein. As illustrated, 302 through 326 may be operations performed by the transmitting device, and 328 through 338 may be performed by the receiving device. In the following description of the process flow 300, the operations may be performed in a different order than the exemplary order shown. Certain operations may also be left out of the process flow 300, or other operations may be added to the process flow 300.

As illustrated in process flow 300, a transmitting device may sample and process a time domain signal, generate reconstruction information for the time domain signal, and transmit the time domain signal and the reconstruction information to a receiving device. The receiving device may process the time domain signal and apply the reconstruction information to reconstruct the time domain signal.

Operations 302 through 306 may be performed by the transmitting device when transmitting a signal to another device (e.g., the receiving device). For example, at 302, the transmitting device may perform modulation of a signal (e.g., data and/or control information to be transmitted). In such cases, any combination of modulation techniques (e.g., frequency modulation, phase modulation, amplitude modulation, digital modulation, or the like) may be performed at 302. At 304, the signal may be converted from serial to parallel, where multiple streams may be generated from the modulated signal. At 306, the signal may be transformed from a frequency-domain signal to a time-domain signal (e.g., using an inverse fast Fourier transform (IFFT)). That is, the output of the IFFT may be a time-domain signal to be transmitted to the receiving device.

At 307, the transmitting device may generate one or more samples of the time-domain signal output from the IFFT at 306. That is, one or more time-domain samples of the time-domain signal may be generated by the transmitting device, where the time-domain samples may be used in the creation of the reconstruction information described herein.

At 308, the transmitting device may analyze a reference signal, such as an SRS, received from the receiving device. Analysis of the reference signal may provide the transmitting device with information about the uplink channel (e.g., a PUSCH) used to communicate with the receiving device. At 310, the transmitting device may use channel reciprocity or other techniques to estimate channel conditions for the downlink channel (e.g., a PDSCH) between the two devices. At 312, the transmitting device may use the estimated downlink channel conditions to estimate a resolution (e.g., a number of bits) used by an ADC of the receiving device. For example, the receiving device may include or support dynamic ADC resolution sizes, and the transmitting device may use information (e.g., associated with communications with the receiving device) for estimating the number of bits the receiving device may use for its ADC resolution.

At 314, the transmitting device may apply the estimated downlink channel conditions to the samples of the time domain signal to obtain a first set of samples. The transmitting device may also perform clipping and quantization on the samples that have the channel conditions applied at 316 to obtain a second set of samples.

At 318, the transmitting device may use the first set of samples (e.g., the unclipped samples with the channel conditions applied from 314) and the second set of samples (e.g., the clipped and quantized samples from 316) as inputs for generating reconstruction information. The transmitting device may process the first and second sets of samples, for example, using a machine learning algorithm, an iterative hypothesis testing algorithm, or some combination thereof. The algorithms used for processing the first and second signal (e.g., the clipped and unclipped signals) may be any computer algorithms that are capable of improving through iterations and using various inputs. Some examples of machine learning algorithms that may be used at 318 include supervised learning, unsupervised learning, reinforcement learning, optimization-based learning, statistical-based learning, neural networks (e.g., convolutional neural networks, recurrent neural networks, generative adversarial networks), among other examples. Such examples are not an exhaustive list of the techniques that may be used for generating the reconstruction information described herein, and other examples may be possible. In addition, some techniques may be combined or used with other algorithms or techniques that are not explicitly described herein.

At 320, the transmitting device may combine the generated reconstruction information with the second set of samples (e.g., the clipped and quantized samples) to perform a signal reconstruction of the time-domain signal, for example, to simulate how the receiving device may reconstruct the time domain signal using the reconstruction information. At 322, the transmitting device may input the reconstruction information and the reconstructed signal to an error detecting operation, such as a CRC check operation. The transmitting device may determine whether the error detection operation is successful. If the error detection operation is unsuccessful, the transmitting device may assume that the receiving device may also fail an error detection operation when using the generated reconstruction information. Thus, the transmitting device may reprocess the samples, for example, using the previously used algorithms at 318, and regenerate, modify, adjust, or adapt the reconstruction information. The transmitting device may reconstruct the signal using the reprocessed samples and regenerated reconstruction information and perform another error detection operation. In some examples, the transmitting device may repeat operations 318 through 322 (e.g., over some number of iterations) until an error detection operation is successful.

When an error detection operation is successful, the transmitting device may, at 324, map the reconstruction information to resources for transmission to the receiving device. At 326, the transmitting device may transmit the original time-domain signal (e.g., from 308) and the generated reconstruction information to the receiving device (e.g., using one or more antennas of a transceiver).

At 328, the receiving device may receive the time domain signal and the reconstruction information. At 330, the receiving device may configure a dynamic ADC with an appropriate resolution (e.g., number of bits), for example, based on channel conditions, a power consumption factor, a signal to quantization noise ratio (SQNR) per bit, a battery status, an indication received from the transmitting device, or the like. At 332, the receiving device may process the time domain signal using the configured ADC to obtain a clipped and quantized version of the time-domain signal.

At 334, the receiving device may apply the reconstruction information to the clipped and quantized signal. At 336, the receiving device may configure a number of iterations for performing one or more reconstruction procedures on the clipped and quantized signal to reconstruct the time domain signal using the reconstruction information. At 338, the receiving device may perform the one or more reconstruction procedures for the configured number of iterations and may obtain the reconstructed signal.

Figure 4:
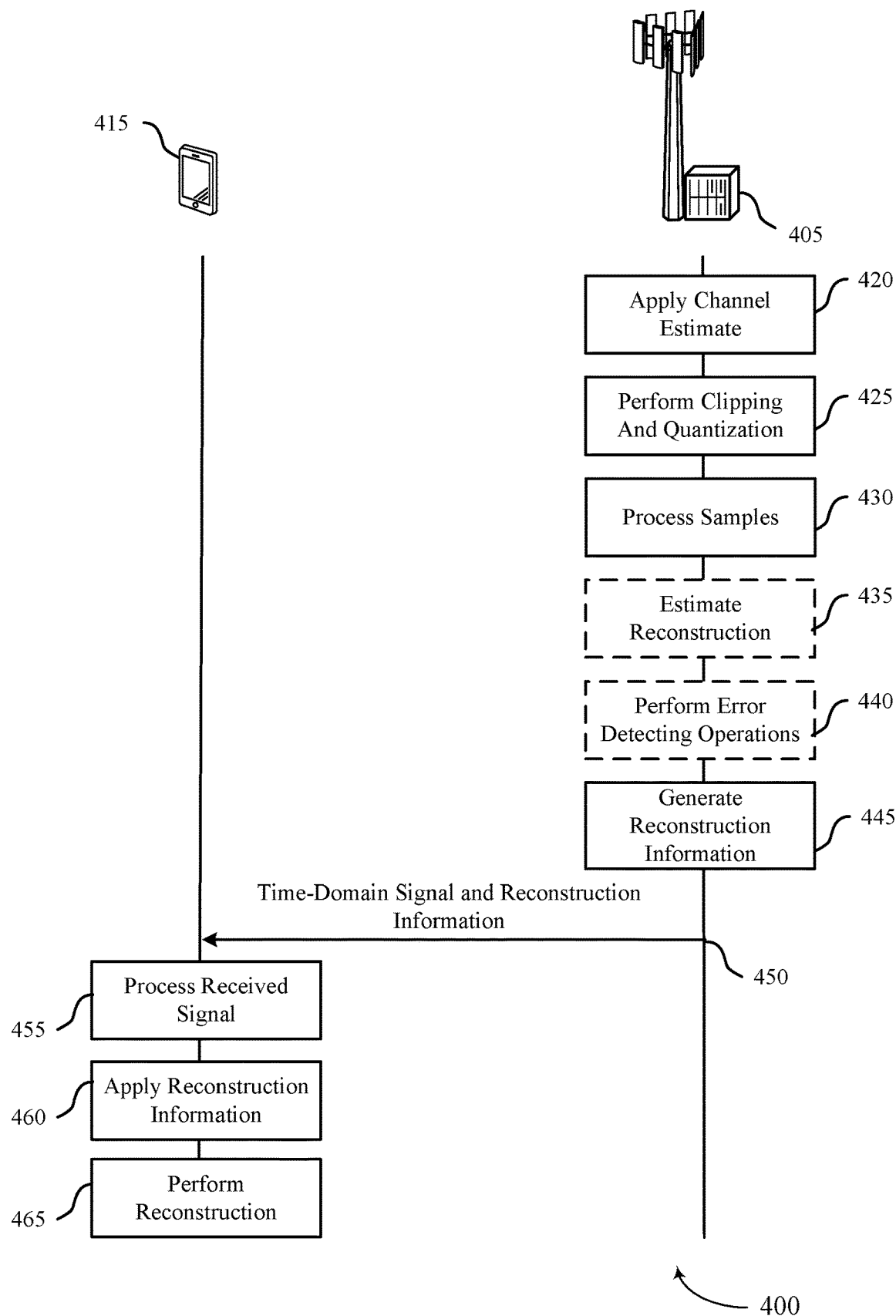

FIG. 4 illustrates an example of a process flow 400 in a system that supports signal reconstruction for dynamic ADCs in accordance with aspects of the present disclosure. Process flow 400 may include a base station 405 and a UE 415, which may be examples of corresponding wireless devices as described herein. In the following description of the process flow 400, the operations between the UE 415 and the base station 405 may be transmitted in a different order than the exemplary order shown, or the operations performed by the UE 415 and the base station 405 may be performed in different orders or at different times. Certain operations may also be left out of the process flow 400, or other operations may be added to the process flow 400. It is to be understood that while the UE 415 and the base station 405 are shown performing operations of process flow 400, any wireless device may perform the operations shown.

In some examples, the UE 415 and the base station 405 may communicate using a high frequency band with a large bandwidth (e.g., as utilized in 5G, FR4, FR5, FR6, 6, or the like). Further, the UE 415 may support a dynamic configuration of two or more ADC resolutions. For example, the UE 415 may be capable of dynamically configuring different ADC resolutions when processing received signals. The base station 405 may transmit messages to the UE 415, and the UE 415 may thus process the transmissions using the dynamically configurable ADC.

At 420, the base station 405 may sample a time-domain signal that is to be transmitted to the UE 415. For example, the base station 405 may generate one or more samples of the time-domain signal, and the base station 405 may further apply a channel estimate to the samples. In some examples, the base station 405 may determine the channel estimate based on a reference signal received from the UE 415 (such as an SRS or other signal), where the base station 405 may assume channel reciprocity for downlink transmissions over the channel.

At 425, the base station 405 may perform clipping and quantization on the samples that have the channel estimate applied. In some cases, the base station 405 may estimate an ADC resolution of the UE 415 and may perform clipping and quantization according to the estimated ADC resolution. For example, the base station 405 may have information related to the ADC resolutions supported by the dynamic ADC of the UE 415, and the base station may estimate an expected number of bits that the UE 415 may use, which may be based on a communications configuration or other parameters. In some examples, the ADC resolution may be estimated based on a received reference signal from the UE 415.

At 430, the base station 405 may process the samples that have the channel estimate applied as well as the samples that were clipped and quantized. The processing may include, but is not limited to, using a machine learning algorithm, an iterative hypothesis testing algorithm, supervised learning algorithms, or any combination thereof.

At 435, the base station 405 may estimate a reconstruction of the time domain signal at the UE 415. That is, the base station 405 may estimate how the UE 415 may reconstruct the signal, for example, based on the estimated ADC resolution, the processing performed at 430, or the like.

At 440, the base station 405 may perform one or more error detecting operations. The error detecting operations may include, for example, one or more CRC operations. The base station 405 may determine whether the one or more error detecting operations were successful. If the one or more error detecting operations were not successful, the base station 405 may reprocess the samples, e.g., using machine learning algorithms, iterative hypothesis testing algorithms, or the like. Additionally or alternatively, the base station 405 may modify or adjust the reconstruction information, for example, based on a failed CRC operation. In such cases, the base station 405 may have knowledge as to why the CRC operation failed, and may modify one or more aspects of the reconstruction information (e.g., using machine learning techniques) to more accurately reconstruct the time-domain signal.

At 445, the base station 405 may generate the reconstruction information for the time-domain signal based on the samples that have the channel estimate applied and/or the clipped and quantized samples. Generating the reconstruction information may include processing the samples, e.g., at 430, and may be based on the estimated reconstruction at 435 as well as the result of the error detecting operations at 440. For instance, if an error detecting operation (e.g., performed at 440) was unsuccessful, the base station 405 may include, in the reconstruction information, correction information related to the unsuccessful error detection operation. The base station 405 may identify check nodes, for example, in a low-density parity check (LDPC) coder, that may have caused an error, such as a CRC error. The base station 405 may further identify samples and/or symbols related to the check nodes and may include an indication of the samples and/or symbols in the reconstruction information. Additionally, or alternatively, the base station 405 may identify equations related to the unsuccessful error detecting operation, such as an equation that did not pass a decoder (e.g., a Reed Solomon decoder), and may include equations of indexes of bits to flip. Other solutions related to the unsuccessful error detecting operation may also be indicated in the reconstruction information. In some cases, the base station 405 may identify a number of bits and/or one or more thresholds associated with the error detecting operations performed at 440 and may include, in the reconstruction information, an indication of the number of bits, the one or more thresholds, or both.

Additionally, or alternatively, the base station 405 may identify one or more learning coefficients of the machine learning algorithm, a type or dimensionality of the machine learning algorithm, or some combination thereof, and may include an indication of the coefficients, the type, and/or the dimensionality in the reconstruction information. In some examples, the reconstruction information may include one or more indications of additional information identified by the base station 405. For instance, the base station 405 may identify and indicate a location and value of one or more samples (e.g., one or more clipped samples of the clipped and quantized samples, one or more samples of the time domain samples, one or more frequency domain symbols, or the like) or one or more quantization peaks. Additionally or alternatively, the base station 405 may identify one or more kernels corresponding to nonlinear clipping based on the estimated ADC resolution or one or more filter coefficients, and may include an indication of the kernels, the filter coefficients, or both, as part of the reconstruction information.

At 450, the base station 405 may transmit, and the UE 415 may receive, the time domain signal and the reconstruction information. In some examples, the base station 405 may map the generated reconstruction information to resources for transmission based on the error detecting operation(s) (e.g., at 435) being successful, and may transmit the time domain signal and the reconstruction information based on the mapping.

At 455, the UE 415 may process the received signal according to a resolution of the ADC of the UE 415. Such processing may result in a clipped and quantized version of the received signal.

At 460, the UE 415 may apply the received reconstruction information to the clipped and quantized version of the signal to reconstruct the signal.

At 465, the UE 415 may reconstruct the signal, e.g., by using the reconstruction information to perform one or more reconstruction procedures on the clipped and quantized version of the signal. In some examples, the UE 415 may determine contents of the reconstruction information to be used in the reconstruction procedure(s). For instance, the UE 415 may determine that the reconstruction information includes an indication of a number of bits or one or more thresholds associated with the one or more error detecting operations, an indication of one or more machine learning coefficients associated with the machine learning algorithm, an indication of a type or dimensionality of the machine learning algorithm, or any combination thereof. The UE 415 may also determine that the reconstruction information includes one or more indications of one or more locations and values of samples. For example, the reconstruction information may include an indication of quantization peaks, a location and value of one or more clipped samples, a location and value of one or more time domain samples, a location and value of one or more frequency domain symbols, or some combination thereof. In some cases, the UE 415 may determine that the reconstruction information includes an indication of one or more kernels corresponding to nonlinear clipping based on the ADC resolution, or one or more filter coefficients. In any case, the UE 415 may reconstruct the signal (e.g., perform the reconstruction procedures) based on the indications included in the reconstruction information.

Figure 5:
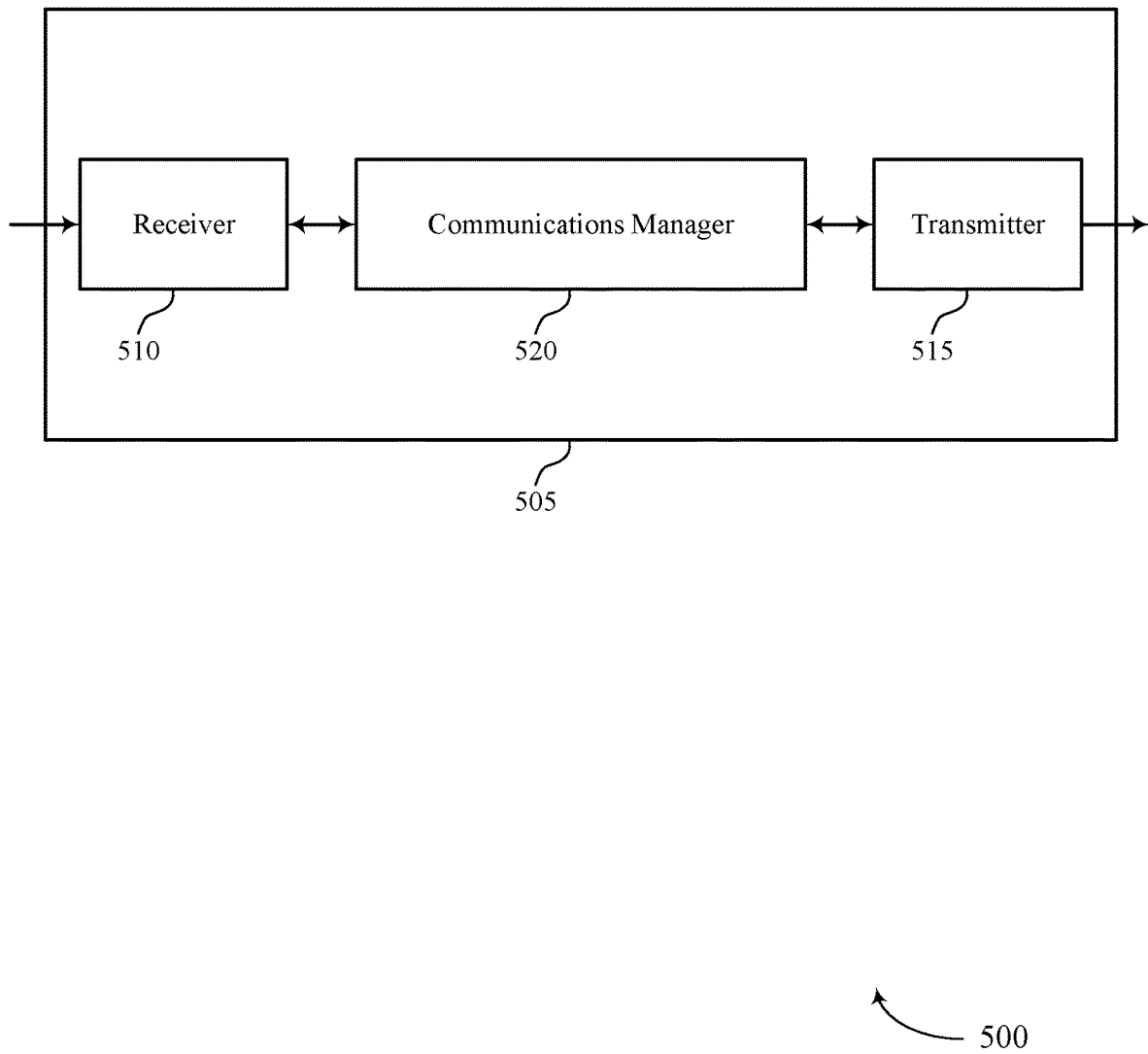
FIGS. 5 and 6 show block diagrams of devices that support signal reconstruction for dynamic ADCs in accordance with aspects of the present disclosure.

FIG. 5 shows a block diagram 500 of a device 505 that supports signal reconstruction for dynamic ADCs in accordance with aspects of the present disclosure. The device 505 may be an example of aspects of a wireless device, such as a UE 115 or base station 105, as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to signal reconstruction for dynamic ADCs). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to signal reconstruction for dynamic ADCs). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of signal reconstruction for dynamic ADCs as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a DSP, an ASIC, a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication in accordance with examples as disclosed herein. For example, the communications manager 520 may be configured as or otherwise support a means for applying a channel estimate to one or more samples of a time-domain signal to be transmitted to a wireless device. The communications manager 520 may be configured as or otherwise support a means for performing clipping and quantization on the one or more samples that have the channel estimate applied, where the clipping and quantization is based on an estimated ADC resolution of the wireless device. The communications manager 520 may be configured as or otherwise support a means for generating reconstruction information for the time-domain signal based on the one or more samples that have the channel estimate applied and the one or more clipped and quantized samples. The communications manager 520 may be configured as or otherwise support a means for transmitting the time-domain signal and the reconstruction information to the wireless device.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for generating and transmitting improved signal reconstruction information to a receiving device that supports a dynamic ADC. The device 505 may generate reconstruction information based on an estimated ADC resolution of the receiving device. In turn, the receiving device may use an appropriate ADC resolution to process the received signal and apply the reconstruction information to more efficiently reconstruct the signal, which may improve communications performance and efficiency between the receiving device and the device 505.

Figure 6:
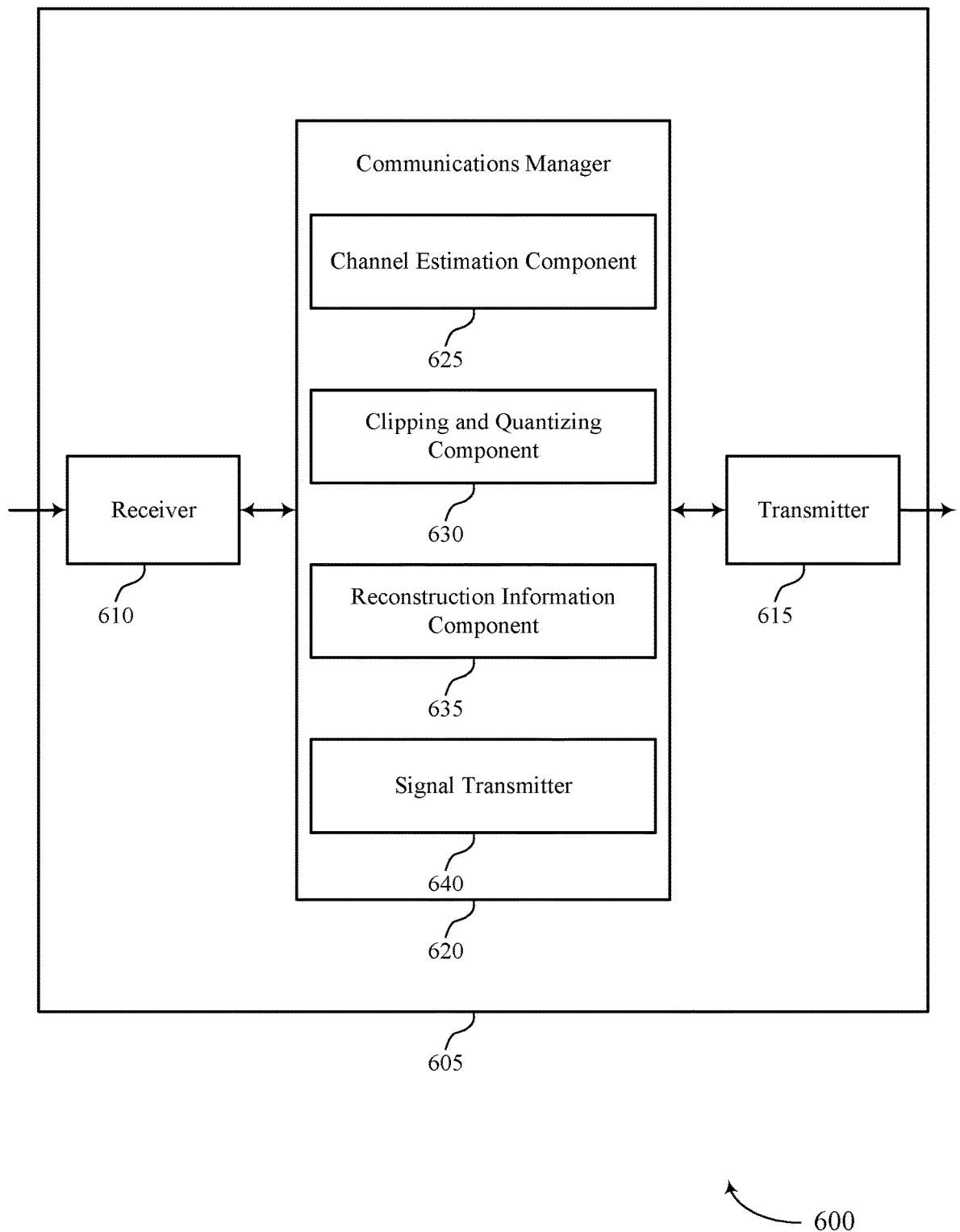

FIG. 6 shows a block diagram 600 of a device 605 that supports signal reconstruction for dynamic ADCs in accordance with aspects of the present disclosure. The device 605 may be an example of aspects of a device 505, a UE 115, or a base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to signal reconstruction for dynamic ADCs). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to signal reconstruction for dynamic ADCs). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of signal reconstruction for dynamic ADCs as described herein. For example, the communications manager 620 may include a channel estimation component 625, a clipping and quantizing component 630, a reconstruction information component 635, a signal transmitter 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication in accordance with examples as disclosed herein. The channel estimation component 625 may be configured as or otherwise support a means for applying a channel estimate to one or more samples of a time-domain signal to be transmitted to a wireless device. The clipping and quantizing component 630 may be configured as or otherwise support a means for performing clipping and quantization on the one or more samples that have the channel estimate applied, where the clipping and quantization is based on an estimated ADC resolution of the wireless device. The reconstruction information component 635 may be configured as or otherwise support a means for generating reconstruction information for the time-domain signal based on the one or more samples that have the channel estimate applied and the one or more clipped and quantized samples. The signal transmitter 640 may be configured as or otherwise support a means for transmitting the time-domain signal and the reconstruction information to the wireless device.

Figure 7:
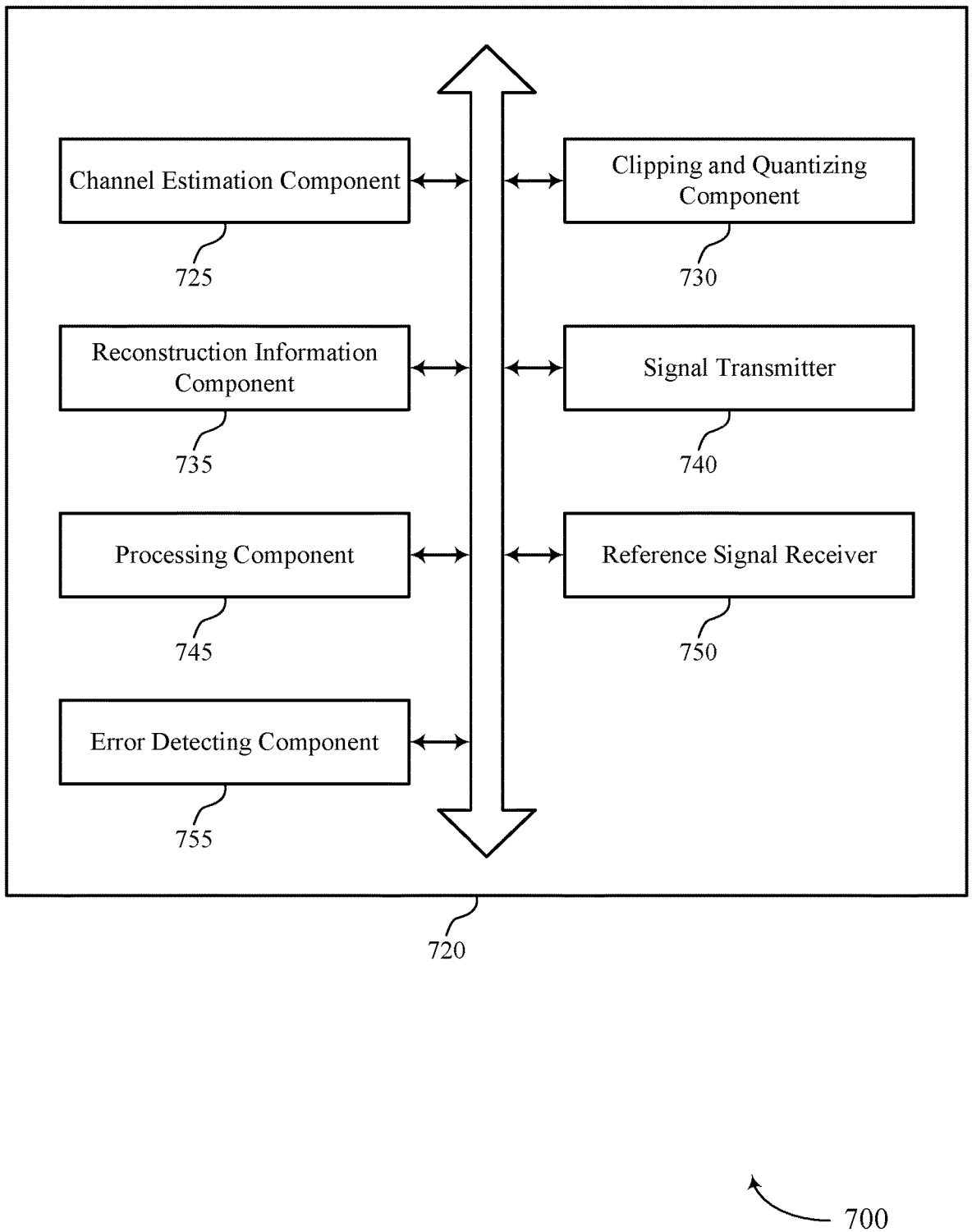
FIG. 7 shows a block diagram of a communications manager that supports signal reconstruction for dynamic ADCs in accordance with aspects of the present disclosure.

FIG. 7 shows a block diagram 700 of a communications manager 720 that supports signal reconstruction for dynamic ADCs in accordance with aspects of the present disclosure. The communications manager 720 may be an example of aspects of a communications manager 520, a communications manager 620, or both, as described herein. The communications manager 720, or various components thereof, may be an example of means for performing various aspects of signal reconstruction for dynamic ADCs as described herein. For example, the communications manager 720 may include a channel estimation component 725, a clipping and quantizing component 730, a reconstruction information component 735, a signal transmitter 740, a processing component 745, a reference signal receiver 750, an error detecting component 755, or any combination thereof. Each of these components may communicate, directly or indirectly, with one another (e.g., via one or more buses).

The communications manager 720 may support wireless communication in accordance with examples as disclosed herein. The channel estimation component 725 may be configured as or otherwise support a means for applying a channel estimate to one or more samples of a time-domain signal to be transmitted to a wireless device. The clipping and quantizing component 730 may be configured as or otherwise support a means for performing clipping and quantization on the one or more samples that have the channel estimate applied, where the clipping and quantization is based on an estimated ADC resolution of the wireless device. The reconstruction information component 735 may be configured as or otherwise support a means for generating reconstruction information for the time-domain signal based on the one or more samples that have the channel estimate applied and the one or more clipped and quantized samples. The signal transmitter 740 may be configured as or otherwise support a means for transmitting the time-domain signal and the reconstruction information to the wireless device.

In some examples, to support generating the reconstruction information, the processing component 745 may be configured as or otherwise support a means for processing the one or more samples that have the channel estimate applied and the one or more clipped and quantized samples using a machine learning algorithm, an iterative hypothesis testing algorithm, or any combination thereof.

In some examples, the reconstruction information component 735 may be configured as or otherwise support a means for estimating reconstruction of the time-domain signal at the wireless device based on the processing, where the reconstruction information is based on the estimated reconstruction of the time-domain signal.

In some examples, the error detecting component 755 may be configured as or otherwise support a means for performing one or more error detecting operations based on the estimated reconstruction of the time-domain signal, where generating the reconstruction information is based on a result of the one or more error detecting operations.

In some examples, the error detecting component 755 may be configured as or otherwise support a means for determining that an error detecting operation of the one or more error detecting operations was successful. In some examples, the reconstruction information component 735 may be configured as or otherwise support a means for mapping the generated reconstruction information to resources for transmission to the wireless device based on the successful error detecting operation, where transmitting the time-domain signal and the reconstruction information to the wireless device is based on the mapping.

In some examples, the error detecting component 755 may be configured as or otherwise support a means for determining that an error detecting operation of the one or more error detecting operations was unsuccessful. In some examples, the processing component 745 may be configured as or otherwise support a means for reprocessing the one or more samples that have the channel estimate applied and the clipped and quantized one or more samples using the one or more machine learning algorithms, the reprocessing based on the unsuccessful error detecting operation. In some examples, the one or more error detecting operations include cyclic redundancy check operations.

In some examples, the error detecting component 755 may be configured as or otherwise support a means for identifying a number of bits associated with the one or more error detecting operations, one or more thresholds associated with the one or more error detecting operations, or any combination thereof, where the reconstruction information includes an indication of the number of bits, the one or more thresholds, or any combination thereof. In some examples, the error detecting component 755 may be configured as or otherwise support a means for identifying, based at least in part on the unsuccessful error detecting operation, one or more check nodes, equations, or any combination thereof, that are associated with the unsuccessful error detecting operation, where the reconstruction information includes an indication of one or more samples related to the one or more check nodes, one or more symbols related to the check nodes, one or more equations of indexes of bits to flip, or some combination thereof.

In some examples, the reconstruction information component 735 may be configured as or otherwise support a means for identifying one or more machine learning coefficients associated with the machine learning algorithm, a type of the machine learning algorithm, a dimensionality of the machine learning algorithm, or any combination thereof, where the reconstruction information includes an indication of the one or more machine learning coefficients, the type of machine learning algorithm, the dimensionality, or any combination thereof.

In some examples, the reconstruction information component 735 may be configured as or otherwise support a means for identifying, from the one or more clipped and quantized samples, one or more quantization peaks and a location and value of one or more clipped samples, where the reconstruction information includes an indication of the one or more quantization peaks and an indication of the location and value of the one or more clipped samples. In some examples, the reconstruction information component 735 may be configured as or otherwise support a means for identifying, from the one or more samples, a location and value of one or more time-domain samples, where the reconstruction information includes an indication of the location and value of the one or more time-domain samples. In some examples, the reconstruction information component 735 may be configured as or otherwise support a means for identifying, from the one or more samples, a location and value of one or more frequency-domain symbols, where the reconstruction information includes an indication of the location and value of the one or more frequency-domain symbols.

In some examples, the reconstruction information component 735 may be configured as or otherwise support a means for identifying one or more kernels corresponding to nonlinear clipping based on the estimated ADC resolution of the wireless device, where the reconstruction information includes an indication of the one or more kernels.

In some examples, the reconstruction information component 735 may be configured as or otherwise support a means for identifying one or more filter coefficients, where the reconstruction information includes an indication of the one or more filter coefficients.

In some examples, the reference signal receiver 750 may be configured as or otherwise support a means for receiving, from the wireless device, a reference signal. In some examples, the channel estimation component 725 may be configured as or otherwise support a means for generating the channel estimate based on the received reference signal. In some examples, the reference signal receiver 750 may be configured as or otherwise support a means for determining the estimated ADC resolution of the wireless device based on the received reference signal.

Figure 8:
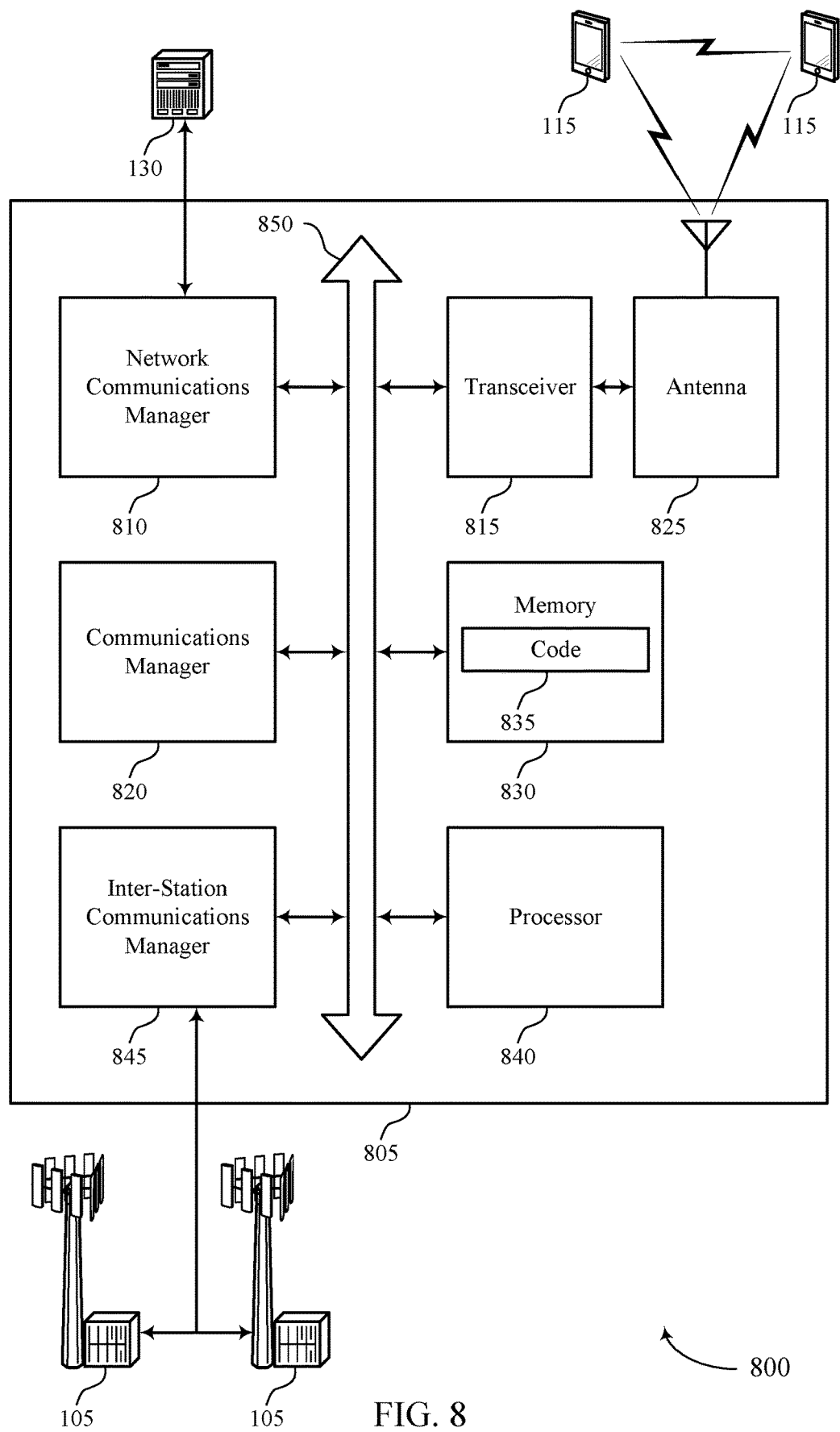
FIG. 8 shows a diagram of a system including a device that supports signal reconstruction for dynamic ADCs in accordance with aspects of the present disclosure.

FIG. 8 shows a diagram of a system 800 including a device 805 that supports signal reconstruction for dynamic ADCs in accordance with aspects of the present disclosure. The device 805 may be an example of or include the components of a device 505, a device 605, a UE 115, or a base station 105 as described herein. The device 805 may communicate wirelessly with one or more base stations 105, UEs 115, or any combination thereof. The device 805 may include components for bi-directional voice and data communications including components for transmitting and receiving communications, such as a communications manager 820, a network communications manager 810, a transceiver 815, an antenna 825, a memory 830, code 835, a processor 840, and an inter-station communications manager 845. These components may be in electronic communication or otherwise coupled (e.g., operatively, communicatively, functionally, electronically, electrically) via one or more buses (e.g., a bus 850).

The network communications manager 810 may manage communications with a core network 130 (e.g., via one or more wired backhaul links). For example, the network communications manager 810 may manage the transfer of data communications for client devices, such as one or more UEs 115.

In some cases, the device 805 may include a single antenna 825. However, in some other cases the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random-access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a BIOS which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting signal reconstruction for dynamic ADCs). For example, the device 805 or a component of the device 805 may include a processor 840 and memory 830 coupled to the processor 840, the processor 840 and memory 830 configured to perform various functions described herein.

The inter-station communications manager 845 may manage communications with other base stations 105, and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communications network technology to provide communication between base stations 105.

The communications manager 820 may support wireless communication in accordance with examples as disclosed herein. For example, the communications manager 820 may be configured as or otherwise support a means for applying a channel estimate to one or more samples of a time-domain signal to be transmitted to a wireless device. The communications manager 820 may be configured as or otherwise support a means for performing clipping and quantization on the one or more samples that have the channel estimate applied, where the clipping and quantization is based on an estimated ADC resolution of the wireless device. The communications manager 820 may be configured as or otherwise support a means for generating reconstruction information for the time-domain signal based on the one or more samples that have the channel estimate applied and the one or more clipped and quantized samples. The communications manager 820 may be configured as or otherwise support a means for transmitting the time-domain signal and the reconstruction information to the wireless device.

By including or configuring the communications manager 820 in accordance with examples as described herein, the device 805 may support techniques for generating and transmitting improved signal reconstruction information to a receiving device that supports a dynamic ADC. The device 805 may generate reconstruction information based on an estimated ADC resolution of the receiving device, enabling the receiving device to perform more efficient signal reconstruction. For example, the receiving device may reduce a number of bits used at the ADC and thus reduce power consumption. Accordingly, the device 805 and the receiving device may communicate at higher frequency ranges without suffering increased power consumption associated with a higher-resolution ADC.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of signal reconstruction for dynamic ADCs as described herein, or the processor 840 and the memory 830 may be otherwise configured to perform or support such operations.

Figure 9:
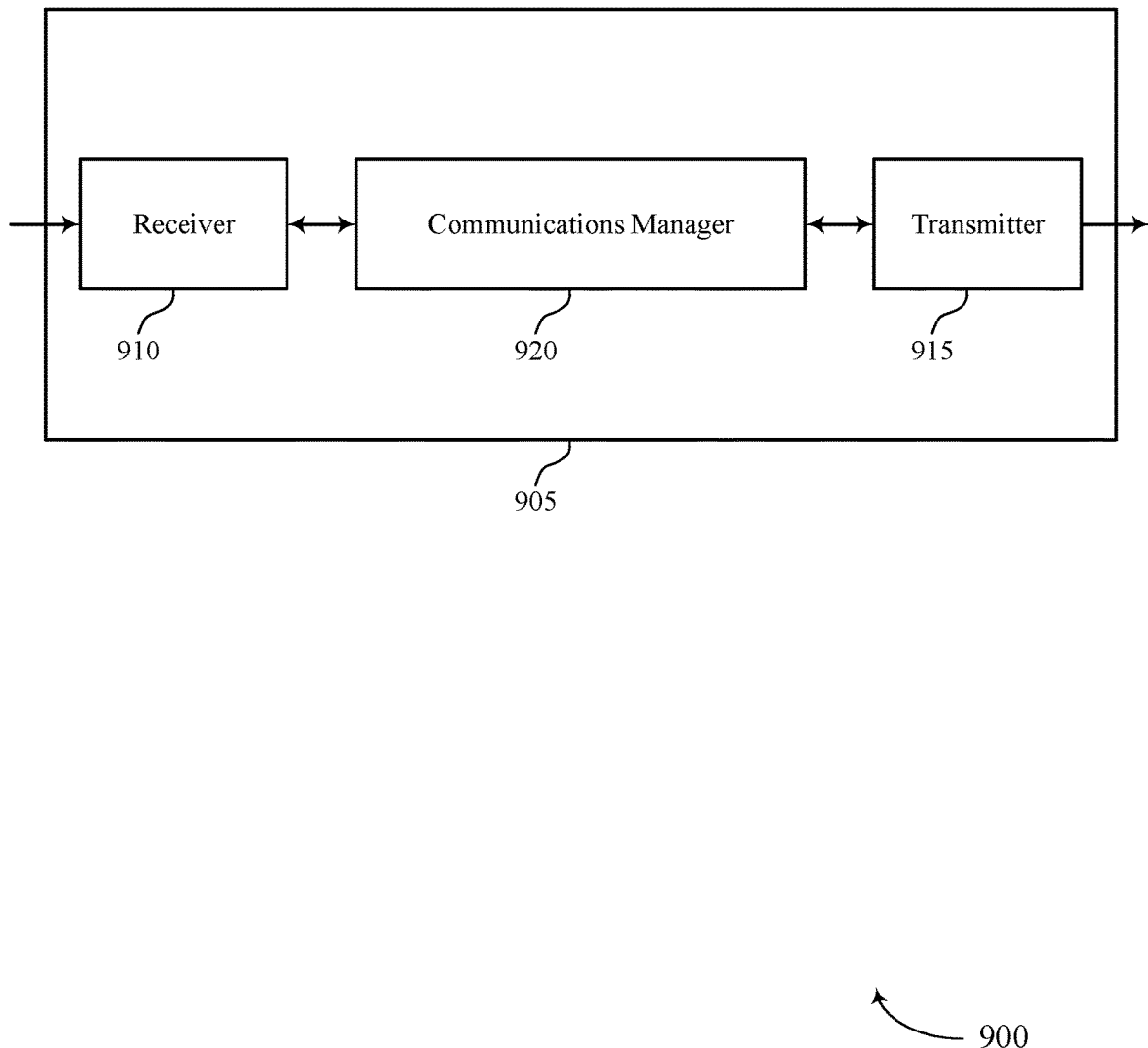
FIGS. 9 and 10 show block diagrams of devices that support signal reconstruction for dynamic ADCs in accordance with aspects of the present disclosure.

FIG. 9 shows a block diagram 900 of a device 905 that supports signal reconstruction for dynamic ADCs in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to signal reconstruction for dynamic ADCs). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to signal reconstruction for dynamic ADCs). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of signal reconstruction for dynamic ADCs as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a wireless device in accordance with examples as disclosed herein. For example, the communications manager 920 may be configured as or otherwise support a means for receiving a signal and reconstruction information for the signal. The communications manager 920 may be configured as or otherwise support a means for processing the received signal based on a resolution of an ADC resolution of the wireless device, where the processing results in a clipped and quantized version of the signal. The communications manager 920 may be configured as or otherwise support a means for applying the reconstruction information to the clipped and quantized version of the signal. The communications manager 920 may be configured as or otherwise support a means for reconstructing the signal based on the applied reconstruction information.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for improved signal reconstruction information. A lower resolution ADC may reduce power consumption at the device 1205, which may improve user experience and extend battery life. Additionally, using a lower resolution ADC may enable the device 1205 to communicate in higher frequency ranges with less power consumption than conventional ADCs, improving communications efficiency and reliability.

Figure 10:
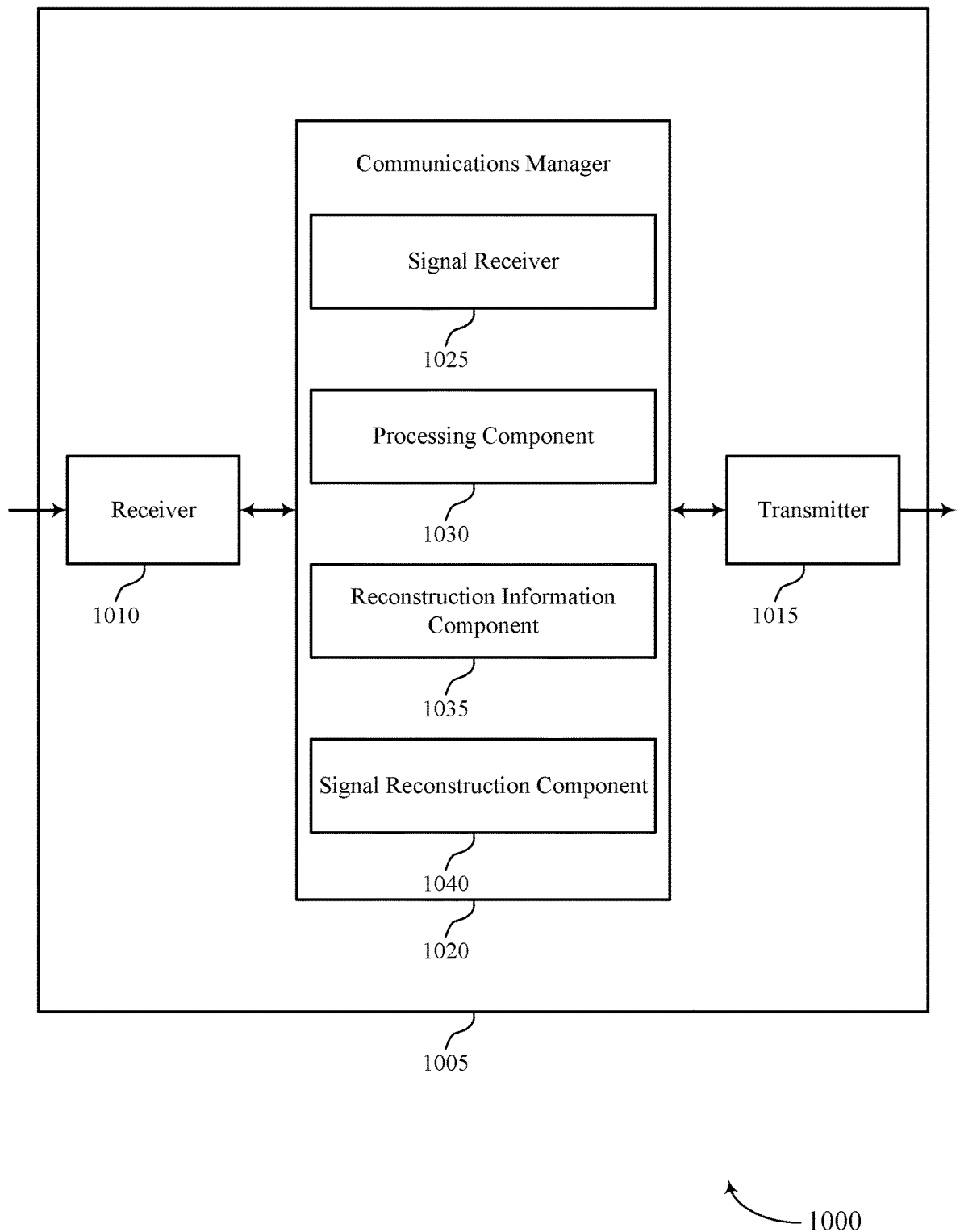

FIG. 10 shows a block diagram 1000 of a device 1005 that supports signal reconstruction for dynamic ADCs in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to signal reconstruction for dynamic ADCs). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to signal reconstruction for dynamic ADCs). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of signal reconstruction for dynamic ADCs as described herein. For example, the communications manager 1020 may include a signal receiver 1025, a processing component 1030, a reconstruction information component 1035, a signal reconstruction component 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a wireless device in accordance with examples as disclosed herein. The signal receiver 1025 may be configured as or otherwise support a means for receiving a signal and reconstruction information for the signal. The processing component 1030 may be configured as or otherwise support a means for processing the received signal based on a resolution of an ADC resolution of the wireless device, where the processing results in a clipped and quantized version of the signal. The reconstruction information component 1035 may be configured as or otherwise support a means for applying the reconstruction information to the clipped and quantized version of the signal. The signal reconstruction component 1040 may be configured as or otherwise support a means for reconstructing the signal based on the applied reconstruction information.

Figure 11:
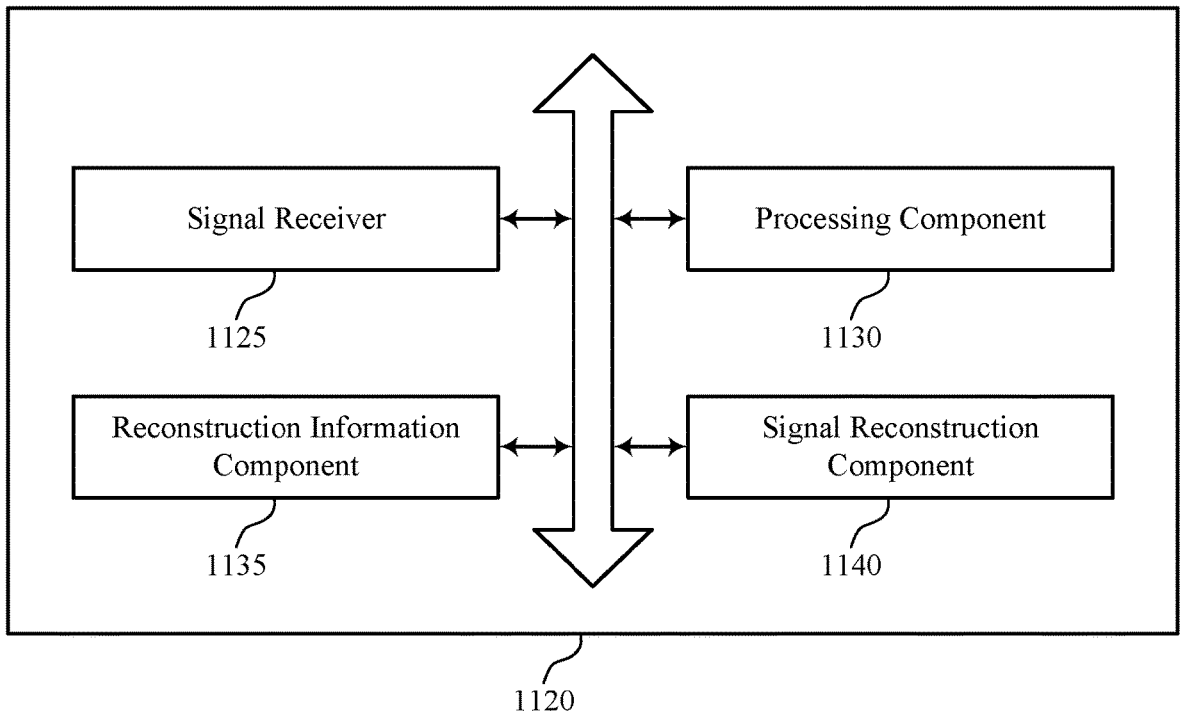
FIG. 11 shows a block diagram of a communications manager that supports signal reconstruction for dynamic ADCs in accordance with aspects of the present disclosure.

FIG. 11 shows a block diagram 1100 of a communications manager 1120 that supports signal reconstruction for dynamic ADCs in accordance with aspects of the present disclosure. The communications manager 1120 may be an example of aspects of a communications manager 920, a communications manager 1020, or both, as described herein. The communications manager 1120, or various components thereof, may be an example of means for performing various aspects of signal reconstruction for dynamic ADCs as described herein. For example, the communications manager 1120 may include a signal receiver 1125, a processing component 1130, a reconstruction information component 1135, a signal reconstruction component 1140, or any combination thereof. Each of these components may communicate, directly or indirectly, with one another (e.g., via one or more buses).

The communications manager 1120 may support wireless communication at a wireless device in accordance with examples as disclosed herein. The signal receiver 1125 may be configured as or otherwise support a means for receiving a signal and reconstruction information for the signal. The processing component 1130 may be configured as or otherwise support a means for processing the received signal based on a resolution of an ADC resolution of the wireless device, where the processing results in a clipped and quantized version of the signal. The reconstruction information component 1135 may be configured as or otherwise support a means for applying the reconstruction information to the clipped and quantized version of the signal. The signal reconstruction component 1140 may be configured as or otherwise support a means for reconstructing the signal based on the applied reconstruction information.

In some examples, to support reconstructing the signal, the signal reconstruction component 1140 may be configured as or otherwise support a means for performing one or more reconstruction procedures on the clipped and quantized version of the signal using the reconstruction information.

In some examples, the signal reconstruction component 1140 may be configured as or otherwise support a means for configuring a number of iterations for the one or more reconstruction procedures, where reconstructing the signal is based on the configured number of iterations.

In some examples, the reconstruction information component 1135 may be configured as or otherwise support a means for determining that the reconstruction information includes an indication of a number of bits associated with one or more error detecting operations, one or more thresholds associated with the one or more error detecting operations, or any combination thereof, where the one or more reconstruction procedures are based on the one or more error detecting operations, the number of bits, the one or more thresholds, or any combination thereof.

In some examples, the reconstruction information component 1135 may be configured as or otherwise support a means for determining that the reconstruction information includes an indication of one or more machine learning coefficients associated with a machine learning algorithm, a type of the machine learning algorithm, a dimensionality of the machine learning algorithm, or any combination thereof, where the one or more reconstruction procedures are based on the machine learning algorithm, the one or more machine learning coefficients, the type of machine learning algorithm, the dimensionality, or any combination thereof.

In some examples, the reconstruction information component 1135 may be configured as or otherwise support a means for determining that the reconstruction information includes an indication of a location and value of one or more clipped samples, where the one or more reconstruction procedures are based on the location and value of the one or more clipped samples.

In some examples, the reconstruction information component 1135 may be configured as or otherwise support a means for determining that the reconstruction information includes an indication of a location and value of one or more time-domain samples, where the one or more reconstruction procedures are based on the location and value of the one or more time-domain samples.

In some examples, the reconstruction information component 1135 may be configured as or otherwise support a means for determining that the reconstruction information includes an indication of a location and value of one or more frequency-domain symbols, where the one or more reconstruction procedures are based on the location and value of the one or more frequency-domain symbols.

In some examples, the reconstruction information component 1135 may be configured as or otherwise support a means for determining that the reconstruction information includes an indication of one or more kernels corresponding to nonlinear clipping based on the ADC resolution of the wireless device, where the one or more reconstruction procedures are based on the one or more kernels.

In some examples, the reconstruction information component 1135 may be configured as or otherwise support a means for determining that the reconstruction information includes an indication of one or more filter coefficients, where the one or more reconstruction procedures are based on the one or more filter coefficients.

In some examples, the wireless device supports a dynamic configuration of two or more ADC resolutions.

Figure 12:
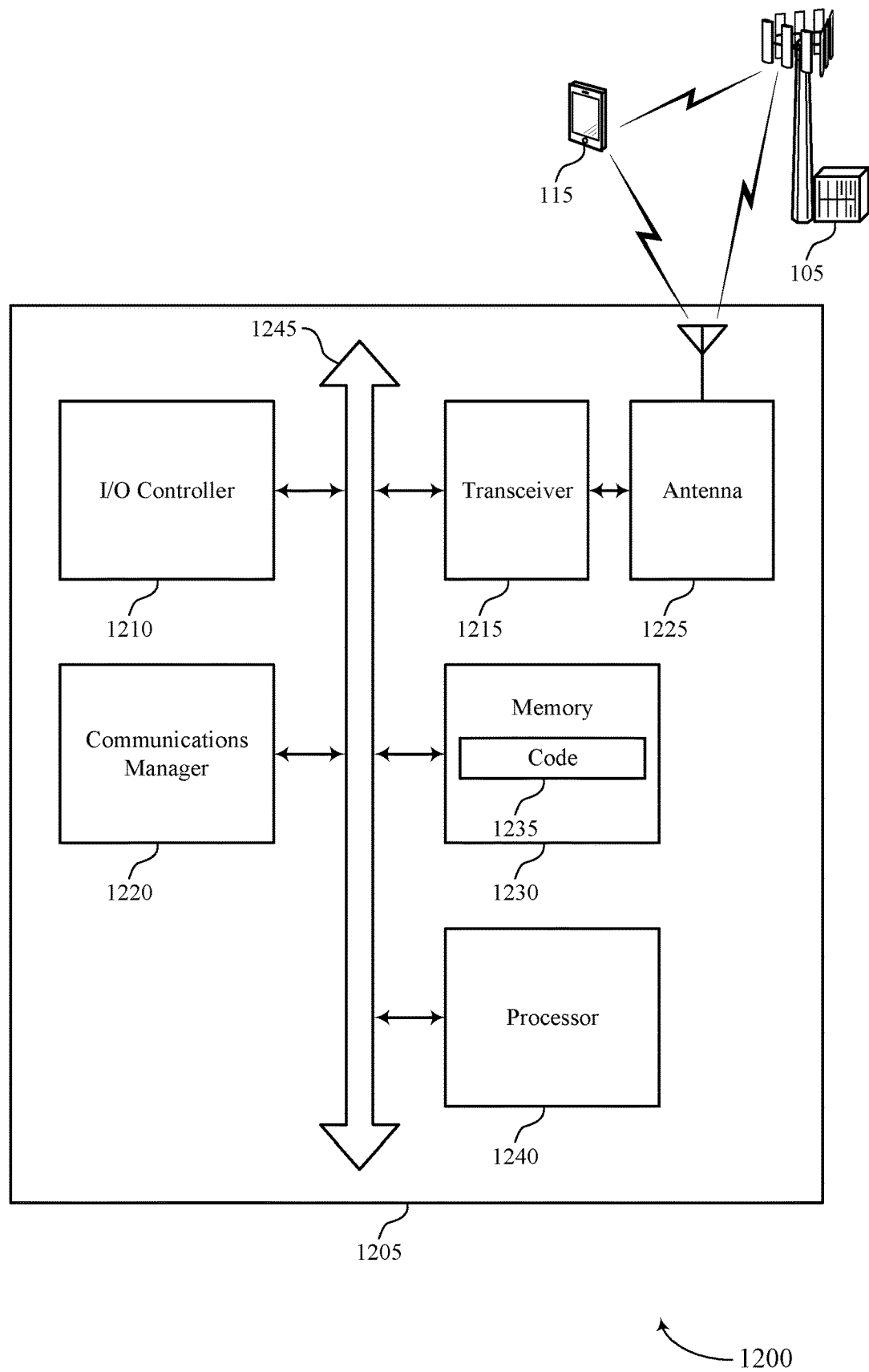
FIG. 12 shows a diagram of a system including a device that supports signal reconstruction for dynamic ADCs in accordance with aspects of the present disclosure.

FIG. 12 shows a diagram of a system 1200 including a device 1205 that supports signal reconstruction for dynamic ADCs in accordance with aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting signal reconstruction for dynamic ADCs). For example, the device 1205 or a component of the device 1205 may include a processor 1240 and memory 1230 coupled to the processor 1240, the processor 1240 and memory 1230 configured to perform various functions described herein.

The communications manager 1220 may support wireless communication at a wireless device in accordance with examples as disclosed herein. For example, the communications manager 1220 may be configured as or otherwise support a means for receiving a signal and reconstruction information for the signal. The communications manager 1220 may be configured as or otherwise support a means for processing the received signal based on a resolution of an ADC resolution of the wireless device, where the processing results in a clipped and quantized version of the signal. The communications manager 1220 may be configured as or otherwise support a means for applying the reconstruction information to the clipped and quantized version of the signal. The communications manager 1220 may be configured as or otherwise support a means for reconstructing the signal based on the applied reconstruction information.

By including or configuring the communications manager 1220 in accordance with examples as described herein, the device 1205 may support techniques for optimizing a resolution of a dynamically configurable ADC. The device 1205 may reduce a number of bits used at the ADC based on receiving reconstruction information for a signal. A lower resolution ADC may reduce power consumption at the device 1205, which may improve user experience and extend battery life. Additionally, using a lower resolution ADC may enable the device 1205 to communicate in higher frequency ranges with less power consumption than conventional ADCs, improving communications efficiency and reliability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of signal reconstruction for dynamic ADCs as described herein, or the processor 1240 and the memory 1230 may be otherwise configured to perform or support such operations.

Figure 13:
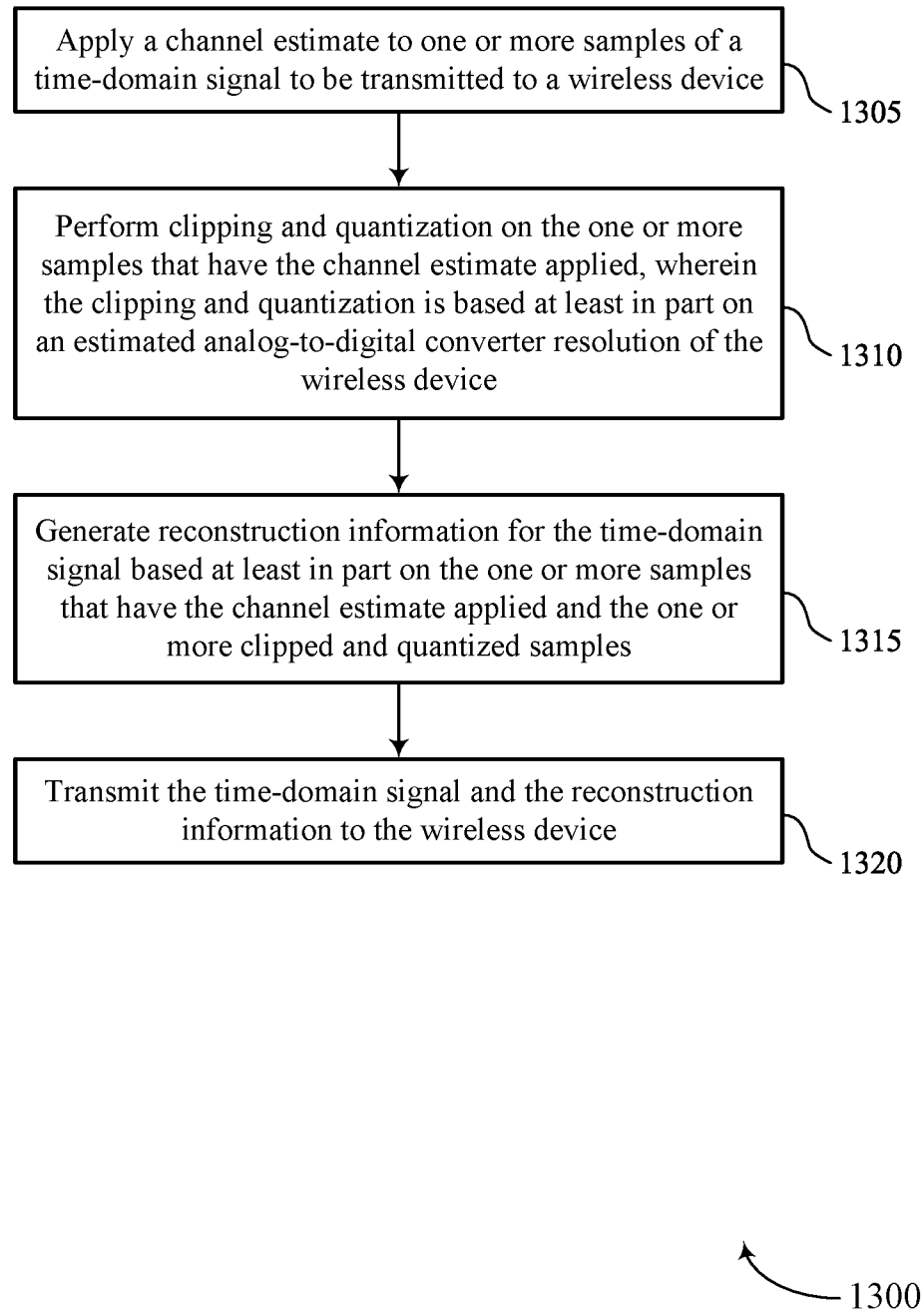
FIGS. 13 through 16 show flowcharts illustrating methods that support signal reconstruction for dynamic ADCs in accordance with aspects of the present disclosure.

FIG. 13 shows a flowchart illustrating a method 1300 that supports signal reconstruction for dynamic ADCs in accordance with aspects of the present disclosure. The operations of the method 1300 may be implemented by a wireless device, such as a base station or UE, or its components as described herein. For example, the operations of the method 1300 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 1305, the method may include applying a channel estimate to one or more samples of a time-domain signal to be transmitted to a wireless device. The operations of 1305 may be performed in accordance with examples as disclosed herein. In some examples, aspects of the operations of 1305 may be performed by a channel estimation component 725 as described with reference to FIG. 7.

At 1310, the method may include performing clipping and quantization on the one or more samples that have the channel estimate applied, where the clipping and quantization is based on an estimated ADC resolution of the wireless device. The operations of 1310 may be performed in accordance with examples as disclosed herein. In some examples, aspects of the operations of 1310 may be performed by a clipping and quantizing component 730 as described with reference to FIG. 7.

At 1315, the method may include generating reconstruction information for the time-domain signal based on the one or more samples that have the channel estimate applied and the one or more clipped and quantized samples. The operations of 1315 may be performed in accordance with examples as disclosed herein. In some examples, aspects of the operations of 1315 may be performed by a reconstruction information component 735 as described with reference to FIG. 7.

At 1320, the method may include transmitting the time-domain signal and the reconstruction information to the wireless device. The operations of 1320 may be performed in accordance with examples as disclosed herein. In some examples, aspects of the operations of 1320 may be performed by a signal transmitter 740 as described with reference to FIG. 7.

Figure 14:
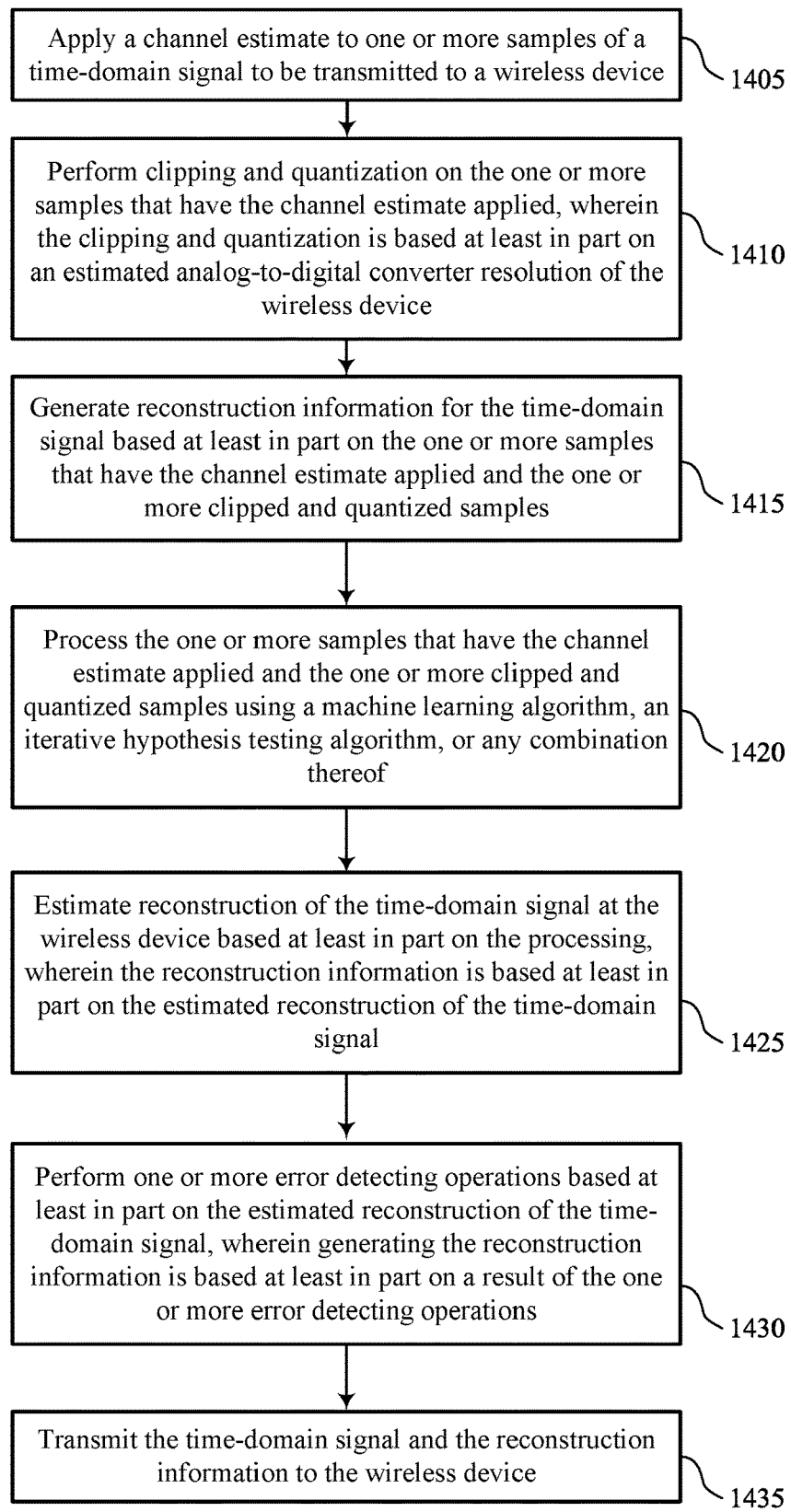

FIG. 14 shows a flowchart illustrating a method 1400 that supports signal reconstruction for dynamic ADCs in accordance with aspects of the present disclosure. The operations of the method 1400 may be implemented by a wireless device, such as a base station or UE, or its components as described herein. For example, the operations of the method 1400 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 1405, the method may include applying a channel estimate to one or more samples of a time-domain signal to be transmitted to a wireless device. The operations of 1405 may be performed in accordance with examples as disclosed herein. In some examples, aspects of the operations of 1405 may be performed by a channel estimation component 725 as described with reference to FIG. 7.

At 1410, the method may include performing clipping and quantization on the one or more samples that have the channel estimate applied, where the clipping and quantization is based on an estimated ADC resolution of the wireless device. The operations of 1410 may be performed in accordance with examples as disclosed herein. In some examples, aspects of the operations of 1410 may be performed by a clipping and quantizing component 730 as described with reference to FIG. 7.

At 1415, the method may include generating reconstruction information for the time-domain signal based on the one or more samples that have the channel estimate applied and the one or more clipped and quantized samples. The operations of 1415 may be performed in accordance with examples as disclosed herein. In some examples, aspects of the operations of 1415 may be performed by a reconstruction information component 735 as described with reference to FIG. 7.

At 1420, the method may include processing the one or more samples that have the channel estimate applied and the one or more clipped and quantized samples using a machine learning algorithm, an iterative hypothesis testing algorithm, or any combination thereof. The operations of 1420 may be performed in accordance with examples as disclosed herein. In some examples, aspects of the operations of 1420 may be performed by a processing component 745 as described with reference to FIG. 7.

At 1425, the method may include estimating reconstruction of the time-domain signal at the wireless device based on the processing, where the reconstruction information is based on the estimated reconstruction of the time-domain signal. The operations of 1425 may be performed in accordance with examples as disclosed herein. In some examples, aspects of the operations of 1425 may be performed by a reconstruction information component 735 as described with reference to FIG. 7.

At 1430, the method may include performing one or more error detecting operations based on the estimated reconstruction of the time-domain signal, where generating the reconstruction information is based on a result of the one or more error detecting operations. The operations of 1430 may be performed in accordance with examples as disclosed herein. In some examples, aspects of the operations of 1430 may be performed by an error detecting component 755 as described with reference to FIG. 7.

At 1435, the method may include transmitting the time-domain signal and the reconstruction information to the wireless device. The operations of 1435 may be performed in accordance with examples as disclosed herein. In some examples, aspects of the operations of 1435 may be performed by a signal transmitter 740 as described with reference to FIG. 7.

Figure 15:
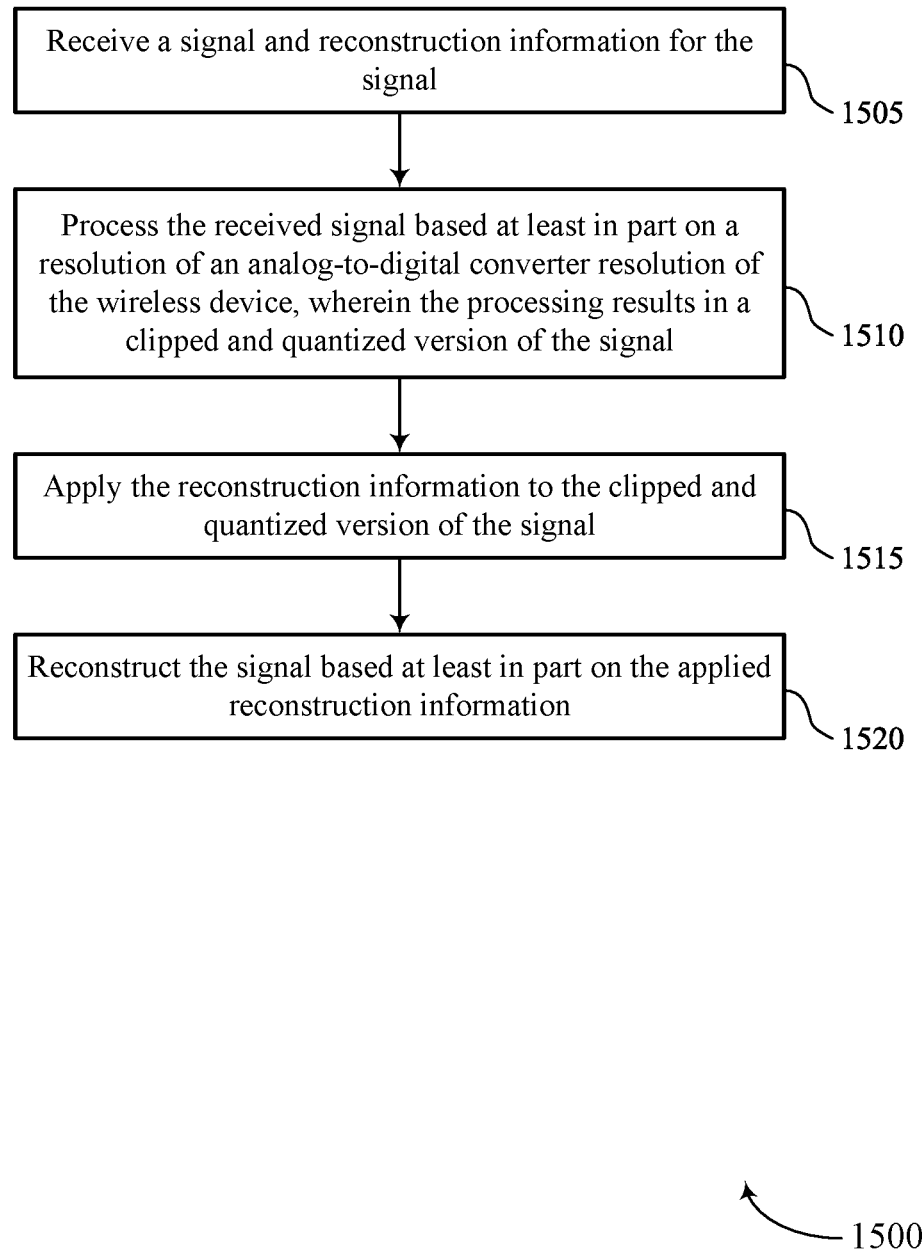

FIG. 15 shows a flowchart illustrating a method 1500 that supports signal reconstruction for dynamic ADCs in accordance with aspects of the present disclosure. The operations of the method 1500 may be implemented by a wireless device, such as a UE, or its components as described herein. For example, the operations of the method 1500 may be performed by a UE 115 as described with reference to FIGS. 1 through 4 and 9 through 12. In some examples, a UE may execute a set of instructions to control the functional elements of the UE to perform the described functions. Additionally or alternatively, the UE may perform aspects of the described functions using special-purpose hardware.

At 1505, the method may include receiving a signal and reconstruction information for the signal. The operations of 1505 may be performed in accordance with examples as disclosed herein. In some examples, aspects of the operations of 1505 may be performed by a signal receiver 1125 as described with reference to FIG. 11.

At 1510, the method may include processing the received signal based on a resolution of an ADC resolution of the wireless device, where the processing results in a clipped and quantized version of the signal. The operations of 1510 may be performed in accordance with examples as disclosed herein. In some examples, aspects of the operations of 1510 may be performed by a processing component 1130 as described with reference to FIG. 11.

At 1515, the method may include applying the reconstruction information to the clipped and quantized version of the signal. The operations of 1515 may be performed in accordance with examples as disclosed herein. In some examples, aspects of the operations of 1515 may be performed by a reconstruction information component 1135 as described with reference to FIG. 11.

At 1520, the method may include reconstructing the signal based on the applied reconstruction information. The operations of 1520 may be performed in accordance with examples as disclosed herein. In some examples, aspects of the operations of 1520 may be performed by a signal reconstruction component 1140 as described with reference to FIG. 11.

Figure 16:
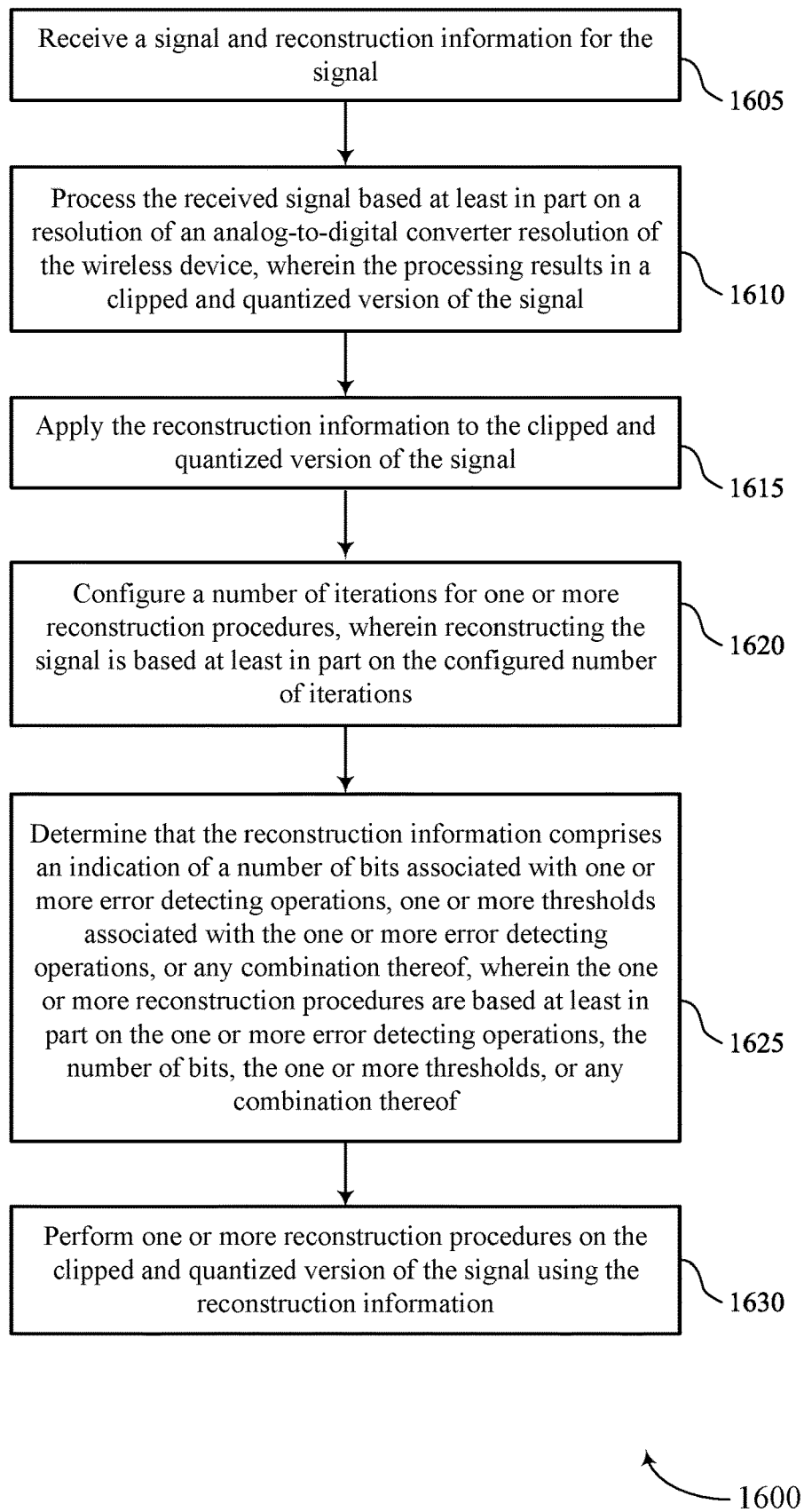

FIG. 16 shows a flowchart illustrating a method 1600 that supports signal reconstruction for dynamic ADCs in accordance with aspects of the present disclosure. The operations of the method 1600 may be implemented by a wireless device, such as a UE, or its components as described herein. For example, the operations of the method 1600 may be performed by a UE 115 as described with reference to FIGS. 1 through 4 and 9 through 12. In some examples, a UE may execute a set of instructions to control the functional elements of the UE to perform the described functions. Additionally or alternatively, the UE may perform aspects of the described functions using special-purpose hardware.

At 1605, the method may include receiving a signal and reconstruction information for the signal. The operations of 1605 may be performed in accordance with examples as disclosed herein. In some examples, aspects of the operations of 1605 may be performed by a signal receiver 1125 as described with reference to FIG. 11.

At 1610, the method may include processing the received signal based on a resolution of an ADC resolution of the wireless device, where the processing results in a clipped and quantized version of the signal. The operations of 1610 may be performed in accordance with examples as disclosed herein. In some examples, aspects of the operations of 1610 may be performed by a processing component 1130 as described with reference to FIG. 11.

At 1615, the method may include applying the reconstruction information to the clipped and quantized version of the signal. The operations of 1615 may be performed in accordance with examples as disclosed herein. In some examples, aspects of the operations of 1615 may be performed by a reconstruction information component 1135 as described with reference to FIG. 11.

At 1620, the method may include configuring a number of iterations for one or more reconstruction procedures, where reconstructing the signal is based on the configured number of iterations. The operations of 1620 may be performed in accordance with examples as disclosed herein. In some examples, aspects of the operations of 1620 may be performed by a signal reconstruction component 1140 as described with reference to FIG. 11.

At 1625, the method may include determining that the reconstruction information includes an indication of a number of bits associated with one or more error detecting operations, one or more thresholds associated with the one or more error detecting operations, or any combination thereof, where the one or more reconstruction procedures are based on the one or more error detecting operations, the number of bits, the one or more thresholds, or any combination thereof. The operations of 1625 may be performed in accordance with examples as disclosed herein. In some examples, aspects of the operations of 1625 may be performed by a reconstruction information component 1135 as described with reference to FIG. 11.

At 1630, the method may include performing one or more reconstruction procedures on the clipped and quantized version of the signal using the reconstruction information. The operations of 1630 may be performed in accordance with examples as disclosed herein. In some examples, aspects of the operations of 1630 may be performed by a signal reconstruction component 1140 as described with reference to FIG. 11.

The following provides an overview of aspects of the present disclosure:

Aspect 1: A method for wireless communication, comprising: applying a channel estimate to one or more samples of a time-domain signal to be transmitted to a wireless device; performing clipping and quantization on the one or more samples that have the channel estimate applied, wherein the clipping and quantization is based at least in part on an estimated ADC resolution of the wireless device; generating reconstruction information for the time-domain signal based at least in part on the one or more samples that have the channel estimate applied and the one or more clipped and quantized samples; and transmitting the time-domain signal and the reconstruction information to the wireless device.

Aspect 2: The method of aspect 1, wherein generating the reconstruction information comprises: processing the one or more samples that have the channel estimate applied and the one or more clipped and quantized samples using a machine learning algorithm, an iterative hypothesis testing algorithm, or any combination thereof.

Aspect 3: The method of aspect 2, further comprising: estimating reconstruction of the time-domain signal at the wireless device based at least in part on the processing, wherein the reconstruction information is based at least in part on the estimated reconstruction of the time-domain signal.

Aspect 4: The method of aspect 3, further comprising: performing one or more error detecting operations based at least in part on the estimated reconstruction of the time-domain signal, wherein generating the reconstruction information is based at least in part on a result of the one or more error detecting operations.

Aspect 5: The method of aspect 4, further comprising: determining that an error detecting operation of the one or more error detecting operations was successful; and mapping the generated reconstruction information to resources for transmission to the wireless device based at least in part on the successful error detecting operation, wherein transmitting the time-domain signal and the reconstruction information to the wireless device is based at least in part on the mapping.

Aspect 6: The method of any of aspects 4 through 5, further comprising: determining that an error detecting operation of the one or more error detecting operations was unsuccessful; and reprocessing the one or more samples that have the channel estimate applied and the clipped and quantized one or more samples using the one or more machine learning algorithms, the reprocessing based at least in part on the unsuccessful error detecting operation.

Aspect 7: The method of any of aspects 4 through 6, wherein the one or more error detecting operations comprise CRC operations.

Aspect 8: The method of any of aspects 4 through 7, further comprising: identifying a number of bits associated with the one or more error detecting operations, one or more thresholds associated with the one or more error detecting operations, or any combination thereof, wherein the reconstruction information comprises an indication of the number of bits, the one or more thresholds, or any combination thereof.

Aspect 9: The method of any of aspects 2 through 8, further comprising: identifying one or more machine learning coefficients associated with the machine learning algorithm, a type of the machine learning algorithm, a dimensionality of the machine learning algorithm, or any combination thereof, wherein the reconstruction information comprises an indication of the one or more machine learning coefficients, the type of machine learning algorithm, the dimensionality, or any combination thereof.

Aspect 10: The method of any of aspects 1 through 9, further comprising: identifying, from the one or more clipped and quantized samples, a location and value of one or more clipped samples, wherein the reconstruction information comprises an indication of the location and value of the one or more clipped samples.

Aspect 11: The method of any of aspects 1 through 10, further comprising: identifying, from the one or more samples, a location and value of one or more time-domain samples, wherein the reconstruction information comprises an indication of the location and value of the one or more time-domain samples.

Aspect 12: The method of any of aspects 1 through 11, further comprising: identifying, from the one or more samples, a location and value of one or more frequency-domain symbols, wherein the reconstruction information comprises an indication of the location and value of the one or more frequency-domain symbols.

Aspect 13: The method of any of aspects 1 through 12, further comprising: identifying one or more kernels corresponding to nonlinear clipping based at least in part on the estimated ADC resolution of the wireless device, wherein the reconstruction information comprises an indication of the one or more kernels.

Aspect 14: The method of any of aspects 1 through 13, further comprising: identifying one or more filter coefficients, wherein the reconstruction information includes an indication of the one or more filter coefficients.

Aspect 15: The method of any of aspects 1 through 14, further comprising: receiving, from the wireless device, a reference signal; and generating the channel estimate based at least in part on the received reference signal.

Aspect 16: The method of aspect 15, further comprising: determining the estimated ADC resolution of the wireless device based at least in part on the received reference signal.

Aspect 17: A method for wireless communication at a wireless device, comprising: receiving a signal and reconstruction information for the signal; processing the received signal based at least in part on a resolution of an ADC resolution of the wireless device, wherein the processing results in a clipped and quantized version of the signal; applying the reconstruction information to the clipped and quantized version of the signal; and reconstructing the signal based at least in part on the applied reconstruction information.

Aspect 18: The method of aspect 17, wherein reconstructing the signal comprises: performing one or more reconstruction procedures on the clipped and quantized version of the signal using the reconstruction information.

Aspect 19: The method of aspect 18, further comprising: configuring a number of iterations for the one or more reconstruction procedures, wherein reconstructing the signal is based at least in part on the configured number of iterations.

Aspect 20: The method of any of aspects 18 through 19, further comprising: determining that the reconstruction information comprises an indication of a number of bits associated with one or more error detecting operations, one or more thresholds associated with the one or more error detecting operations, or any combination thereof, wherein the one or more reconstruction procedures are based at least in part on the one or more error detecting operations, the number of bits, the one or more thresholds, or any combination thereof.

Aspect 21: The method of any of aspects 18 through 20, further comprising: determining that the reconstruction information comprises an indication of one or more machine learning coefficients associated with a machine learning algorithm, a type of the machine learning algorithm, a dimensionality of the machine learning algorithm, or any combination thereof, wherein the one or more reconstruction procedures are based at least in part on the machine learning algorithm, the one or more machine learning coefficients, the type of machine learning algorithm, the dimensionality, or any combination thereof.

Aspect 22: The method of any of aspects 18 through 21, further comprising: determining that the reconstruction information comprises an indication of a location and value of one or more clipped samples, wherein the one or more reconstruction procedures are based at least in part on the location and value of the one or more clipped samples.

Aspect 23: The method of any of aspects 18 through 22, further comprising: determining that the reconstruction information comprises an indication of a location and value of one or more time-domain samples, wherein the one or more reconstruction procedures are based at least in part on the location and value of the one or more time-domain samples.

Aspect 24: The method of any of aspects 18 through 23, further comprising: determining that the reconstruction information comprises an indication of a location and value of one or more frequency-domain symbols, wherein the one or more reconstruction procedures are based at least in part on the location and value of the one or more frequency-domain symbols.

Aspect 25: The method of any of aspects 18 through 24, further comprising: determining that the reconstruction information comprises an indication of one or more kernels corresponding to nonlinear clipping based at least in part on the ADC resolution of the wireless device, wherein the one or more reconstruction procedures are based at least in part on the one or more kernels.

Aspect 26: The method of any of aspects 18 through 25, further comprising: determining that the reconstruction information comprises an indication of one or more filter coefficients, wherein the one or more reconstruction procedures are based at least in part on the one or more filter coefficients.

Aspect 27: The method of any of aspects 17 through 26, wherein the wireless device supports a dynamic configuration of two or more ADC resolutions.

Aspect 28: An apparatus for wireless communication, comprising a processor; memory coupled with the processor; and instructions stored in the memory and executable by the processor to cause the apparatus to perform a method of any of aspects 1 through 16.

Aspect 29: An apparatus for wireless communication, comprising at least one means for performing a method of any of aspects 1 through 16.

Aspect 30: A non-transitory computer-readable medium storing code for wireless communication, the code comprising instructions executable by a processor to perform a method of any of aspects 1 through 16.

Aspect 31: An apparatus for wireless communication at a wireless device, comprising a processor; memory coupled with the processor; and instructions stored in the memory and executable by the processor to cause the apparatus to perform a method of any of aspects 17 through 27.

Aspect 32: An apparatus for wireless communication at a wireless device, comprising at least one means for performing a method of any of aspects 17 through 27.

Aspect 33: A non-transitory computer-readable medium storing code for wireless communication at a wireless device, the code comprising instructions executable by a processor to perform a method of any of aspects 17 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a network device, comprising:
applying, at the network device, a channel estimate to one or more samples of a time-domain signal to be transmitted to a user equipment (UE), the UE being different from the network device;
estimating, at the network device, an analog-to-digital converter resolution of the UE based at least in part on the channel estimate;
performing, at the network device and prior to a transmission of the time-domain signal to the UE, clipping and quantization on the one or more samples of the time-domain signal to be transmitted to the UE that have the channel estimate applied, wherein the clipping and quantization is based at least in part on the estimated analog-to-digital converter resolution of the UE;
generating, at the network device, reconstruction information for the time-domain signal based at least in part on processing the one or more samples that have the channel estimate applied and the one or more clipped and quantized samples using a machine learning algorithm, an iterative hypothesis testing algorithm, or any combination thereof; and
transmitting, to the UE, a message comprising the time-domain signal and the reconstruction information for the time-domain signal.

2. The method of claim 1, further comprising:
estimating, at the network device, reconstruction of the time-domain signal at the UE based at least in part on the processing, wherein the reconstruction information is based at least in part on the estimated reconstruction of the time-domain signal.

3. The method of claim 2, further comprising:
performing one or more error detecting operations based at least in part on the estimated reconstruction of the time-domain signal, wherein generating the reconstruction information is based at least in part on a result of the one or more error detecting operations.

4. The method of claim 3, further comprising:
determining that an error detecting operation of the one or more error detecting operations was successful; and
mapping the generated reconstruction information to resources for transmission to the UE based at least in part on the successful error detecting operation, wherein transmitting the message comprising the time-domain signal and the reconstruction information for the time-domain signal to the UE is based at least in part on the mapping.

5. The method of claim 3, further comprising:
determining that an error detecting operation of the one or more error detecting operations was unsuccessful; and
reprocessing the one or more samples that have the channel estimate applied and the clipped and quantized one or more samples using the one or more machine learning algorithms, the reprocessing based at least in part on the unsuccessful error detecting operation.

6. The method of claim 3, wherein the one or more error detecting operations comprise cyclic redundancy check operations.

7. The method of claim 3, further comprising:
determining that an error detecting operation of the one or more error detecting operations was unsuccessful; and
identifying, based at least in part on the unsuccessful error detecting operation, one or more check nodes, equations, or any combination thereof, that are associated with the unsuccessful error detecting operation, wherein the reconstruction information comprises an indication of one or more samples related to the one or more check nodes, one or more symbols related to the one or more check nodes, one or more equations of indexes of bits to flip, or some combination thereof.

8. The method of claim 3, further comprising:
identifying a quantity of bits associated with the one or more error detecting operations, one or more thresholds associated with the one or more error detecting operations, or any combination thereof, wherein the reconstruction information comprises an indication of the quantity of bits, the one or more thresholds, or any combination thereof.

9. The method of claim 1, further comprising:
identifying one or more machine learning coefficients associated with the machine learning algorithm, a type of the machine learning algorithm, a dimensionality of the machine learning algorithm, or any combination thereof, wherein the reconstruction information comprises an indication of the one or more machine learning coefficients, the type of the machine learning algorithm, the dimensionality, or any combination thereof.

10. The method of claim 1, further comprising:
identifying, from the one or more clipped and quantized samples, one or more quantization peaks and a location and value of one or more clipped samples, wherein the reconstruction information comprises an indication of the one or more quantization peaks and an indication of the location and value of the one or more clipped samples.

11. The method of claim 1, further comprising:
identifying, from the one or more samples, a location and value of one or more time-domain samples, wherein the reconstruction information comprises an indication of the location and value of the one or more time-domain samples.

12. The method of claim 1, further comprising:
identifying, from the one or more samples, a location and value of one or more frequency-domain symbols, wherein the reconstruction information comprises an indication of the location and value of the one or more frequency-domain symbols.

13. The method of claim 1, further comprising:
identifying one or more kernels corresponding to nonlinear clipping based at least in part on the estimated analog-to-digital converter resolution of the UE, wherein the reconstruction information comprises an indication of the one or more kernels.

14. The method of claim 1, further comprising:
identifying one or more filter coefficients, wherein the reconstruction information includes an indication of the one or more filter coefficients.

15. The method of claim 1, further comprising:
receiving, from the UE, a reference signal; and
generating the channel estimate based at least in part on the received reference signal.

16. The method of claim 15,
wherein estimating the analog-to-digital converter resolution of the UE is based at least in part on the received reference signal.

17. A method for wireless communication at a user equipment (UE), comprising:
receiving, from a network device being different from the UE, a message comprising a signal and reconstruction information for the signal, wherein the reconstruction information is based at least in part on an estimated analog-to-digital converter resolution of the UE and a channel estimate;

processing the received signal based at least in part on a configured analog-to-digital converter resolution of the UE, wherein the processing results in a clipped and quantized version of the signal;

applying the reconstruction information to the clipped and quantized version of the signal; and reconstructing the signal based at least in part on performing one or more reconstruction procedures on the clipped and quantized version of the signal using the applied reconstruction information.

18. The method of claim 17, further comprising:
configuring a quantity of iterations for the one or more reconstruction procedures, wherein reconstructing the signal is based at least in part on the configured quantity of iterations.

19. The method of claim 17, further comprising:
determining that the reconstruction information comprises an indication of a quantity of bits associated with one or more error detecting operations, one or more thresholds associated with the one or more error detecting operations, or any combination thereof, wherein the one or more reconstruction procedures are based at least in part on the one or more error detecting operations, the quantity of bits, the one or more thresholds, or any combination thereof.

20. The method of claim 17, further comprising:
determining that the reconstruction information comprises an indication of one or more machine learning coefficients associated with a machine learning algorithm, a type of the machine learning algorithm, a dimensionality of the machine learning algorithm, or any combination thereof, wherein the one or more reconstruction procedures are based at least in part on the machine learning algorithm, the one or more machine learning coefficients, the type of the machine learning algorithm, the dimensionality, or any combination thereof.

21. The method of claim 17, further comprising:
determining that the reconstruction information comprises an indication of a location and value of one or more clipped samples, wherein the one or more reconstruction procedures are based at least in part on the location and value of the one or more clipped samples.

22. The method of claim 17, further comprising:
determining that the reconstruction information comprises an indication of a location and value of one or more time-domain samples, wherein the one or more reconstruction procedures are based at least in part on the location and value of the one or more time-domain samples.

23. The method of claim 17, further comprising:
determining that the reconstruction information comprises an indication of a location and value of one or more frequency-domain symbols, wherein the one or more reconstruction procedures are based at least in part on the location and value of the one or more frequency-domain symbols.

24. The method of claim 17, further comprising:
determining that the reconstruction information comprises an indication of one or more kernels corresponding to nonlinear clipping based at least in part on the configured analog-to-digital converter resolution of the UE, wherein the one or more reconstruction procedures are based at least in part on the one or more kernels.

25. The method of claim 17, further comprising:
determining that the reconstruction information comprises an indication of one or more filter coefficients, wherein the one or more reconstruction procedures are based at least in part on the one or more filter coefficients.

26. The method of claim 17, wherein the UE supports a dynamic configuration of two or more analog-to-digital converter resolutions.

27. An apparatus for wireless communication at a network device comprising:
a processor;
memory coupled with the processor; and
instructions stored in the memory and executable by the processor to cause the apparatus to:
apply, at the network device, a channel estimate to one or more samples of a time-domain signal to be transmitted to a user equipment (UE), the UE being different from the network device;
estimate, at the network device, an analog-to-digital converter resolution of the UE based at least in part on the channel estimate;
perform, at the network device, clipping and quantization on the one or more samples that have the channel estimate applied, wherein the clipping and quantization is based at least in part on the estimated analog-to-digital converter resolution of the UE;
generate, at the network device, reconstruction information for the time-domain signal based at least in part on processing the one or more samples that have the channel estimate applied and the one or more clipped and quantized samples using a machine learning algorithm, an iterative hypothesis testing algorithm, or any combination thereof; and
transmit, to the UE, a message comprising the time-domain signal and the reconstruction information for the time-domain signal.

28. An apparatus for wireless communication at a user equipment (UE), comprising:
a processor;
memory coupled with the processor; and
instructions stored in the memory and executable by the processor to cause the apparatus to:
receive, from a network device different from the UE, a message comprising a signal and reconstruction information for the signal, wherein the reconstruction information is based at least in part on an estimated analog-to-digital converter resolution of the UE and a channel estimate;
process the received signal based at least in part on a configured analog-to-digital converter resolution of the UE, wherein the processing results in a clipped and quantized version of the signal;
apply the reconstruction information to the clipped and quantized version of the signal; and
reconstruct the signal based at least in part on performing one or more reconstruction procedures on the clipped and quantized version of the signal using the applied reconstruction information.

* * * * *